(12) United States Patent
Simak et al.

(10) Patent No.: US 10,140,380 B2
(45) Date of Patent: Nov. 27, 2018

(54) DEVICE, SYSTEM AND PROCESS FOR INMATE RELEASE, HOLDS, CAPACITY MANAGEMENT, BED SPACE BID AUCTION AND DATA SHARING

(71) Applicant: N. Harris Computer Corp., Ottawa (CA)

(72) Inventors: James A. Simak, Jacksonville, FL (US); Jeffery Pugh, Norman, OK (US); David Ogles, Glasgow, KY (US); Matthew Todd Schaefer, Edmond, OK (US); Dalton Jones, Bowling Green, KY (US)

(73) Assignee: N. Harris Computer Corp., Ottawa (CA)

( * ) Notice: Subject to any disclaimer, the term of this patent is extended or adjusted under 35 U.S.C. 154(b) by 0 days.

(21) Appl. No.: 15/589,389

(22) Filed: May 8, 2017

(65) Prior Publication Data
US 2018/0039645 A1 Feb. 8, 2018

Related U.S. Application Data

(60) Provisional application No. 62/332,774, filed on May 6, 2016.

(51) Int. Cl.
| | | |
|---|---|---|
| *G06F 17/00* | (2006.01) | |
| *G06F 17/30* | (2006.01) | |
| *G06Q 50/26* | (2012.01) | |
| *G06Q 10/06* | (2012.01) | |
| *G06Q 10/10* | (2012.01) | |
| *G06Q 50/18* | (2012.01) | |
| *H04L 29/06* | (2006.01) | |

(52) U.S. Cl.
CPC ......... *G06F 17/3089* (2013.01); *G06F 17/30* (2013.01); *G06Q 10/06* (2013.01); *G06Q 10/1093* (2013.01); *G06Q 50/18* (2013.01); *G06Q 50/26* (2013.01); *H04L 63/107* (2013.01)

(58) Field of Classification Search
CPC .......................... G06F 17/3089; G06Q 10/06; G06Q 10/1093; G06Q 50/18; G06Q 50/26; H04L 63/107
USPC ......................... 235/375, 380, 382, 383, 384
See application file for complete search history.

(56) References Cited

U.S. PATENT DOCUMENTS

| | | | |
|---|---|---|---|
| 7,181,493 B2 | 2/2007 | English et al. | |
| 7,860,222 B1 | 12/2010 | Sidler et al. | |
| 8,340,260 B1 | 12/2012 | Rae et al. | |
| 9,262,584 B2 | 2/2016 | Bess et al. | |
| 2004/0117528 A1* | 6/2004 | Beacher | G06Q 30/0603 710/111 |
| 2011/0213618 A1 | 9/2011 | Hodge et al. | |

OTHER PUBLICATIONS

WIPO, International Search Report and Written Opinion for PCT Application No. PCT/CA2017/050556 dated Sep. 21, 2017.

\* cited by examiner

*Primary Examiner* — Karl D Frech
(74) *Attorney, Agent, or Firm* — Lorelei G. Graham

(57) ABSTRACT

An inmate facility management system with a shared storage device and a processor configured to receive data and search requests from multiple disparate facility systems. The processor has an interface to translate data from the multiple disparate facility systems and store the data in the shared storage device. The processor executes booking requests, warrant requests and release requests using the shared storage device.

25 Claims, 21 Drawing Sheets

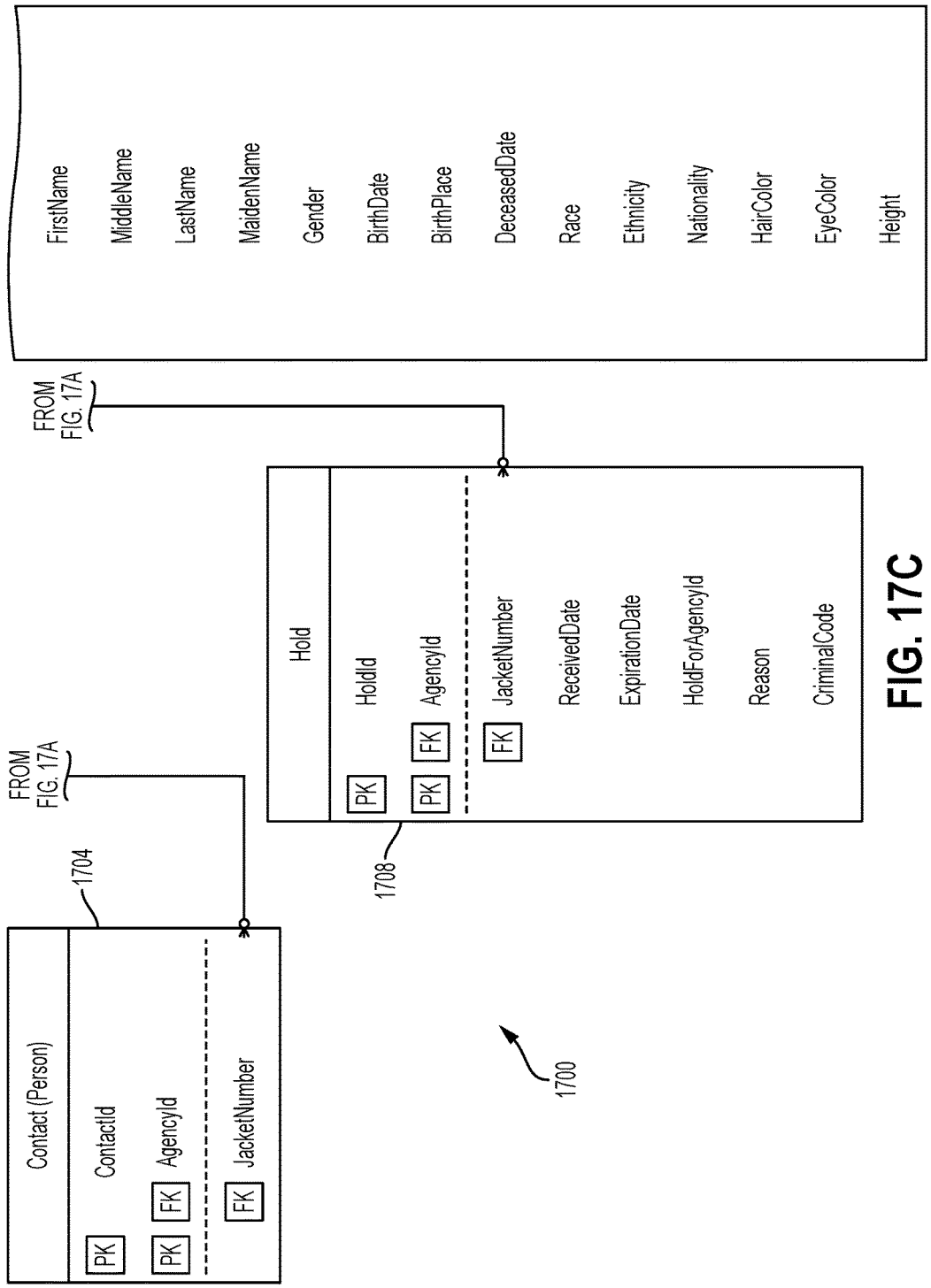

DEVICE, SYSTEM AND PROCESS FOR INMATE RELEASE, HOLDS, CAPACITY MANAGEMENT, BED SPACE BID AUCTION AND DATA SHARING

CROSS REFERENCE TO RELATED APPLICATIONS

This application claims the benefit of and priority to U.S. Provisional Patent Application No. 62/332,774 filed May 6, 2016 the contents of which is hereby incorporated by reference.

FIELD

The present disclosure generally relates to the field of correction facility management systems.

INTRODUCTION

An offender remanded for custody will be booked or assigned to a correction facility, jail, detention centre, prison, penitentiary, remand centre, and the like. The offender may have been previously incarcerated at another facility. A facility system might not be able to access data about the same offender from the other facility system. There might be technical barriers due to incompatible data formats, different standards across different facilities, and a lack of physical connection between the data storage devices, for example. The segregated facility systems create data, processing and storage inefficiencies.

SUMMARY

In accordance with one aspect, the disclosure relates to data sharing across disparate jail facility systems to generate a shared data storage solution referred to as a virtual jacket system. The virtual jacket system synchronizes different data collections for multiple jail facility systems. The virtual jacket system provides data sharing, capacity management, and release and hold control of inmates. The virtual jacket system has capacity bid-auction feature for managing available rooms and beds.

In accordance with another aspect, there is provided an inmate facility management system with a shared storage device and a processor configured to receive data and search requests from multiple disparate facility systems, the processor having an interface to translate data from the multiple disparate facility systems and store the data in the shared storage device.

In accordance with another aspect, there is provided an inmate facility management system configured to receive a booking request, execute a local and extended search using the booking request and a link between a local inmate record and a shared inmate record, populate a booking record using the results of the local and extended search, and update the local inmate record and the shared inmate record to indicate the booking request.

In accordance with another aspect, there is provided an inmate facility management system configured to receive a warrant request, execute a local and extended search using the warrant request and a link between a local inmate record and a shared inmate record, generate a hold request based on the results of the local and extended search, and update the local inmate record and the shared inmate record to indicate the hold request.

In accordance with another aspect, there is provided an inmate facility management system configured to receive a release request, execute a local and extended search using the release request and a link between a local inmate record and a shared inmate record, populate a release record using the results of the local and extended search, and update the local inmate record and the shared inmate record to indicate the release request.

In accordance with another aspect, there is provided an inmate facility management system comprising: a shared storage device to store a plurality of inmate records and a plurality of facility records from multiple disparate facility systems; an interface to receive a search request for an open bed in a facility system for an inmate; a processor configured to: translate data from the multiple disparate facility systems to the plurality of inmate records and the plurality of facility records; determine in real time a set of open beds for an aggregated jail capacity using the plurality of inmate records and the plurality of facility records from the multiple disparate facility systems; update the interface to indicate the set of open beds for the aggregated jail capacity; receive a booking request to book the open bed from the set of open beds; update an inmate record of the plurality of inmate records corresponding to the inmate and a facility record of the plurality of facility records corresponding to the facility system; populate a booking record for the open bed using the inmate record and the facility record; and update the interface to display the booking request, the inmate record and the facility record.

In some embodiments, the processor is configured to process the booking request by executing a local and extended search using a link between a local inmate record and a shared inmate record, populate the booking record using the results of the local and extended search, and update the local inmate record and the shared inmate record to indicate the booking record.

In some embodiments, the processor is configured to receive a warrant request, execute a local and extended search using the warrant request and a link between a local inmate record and a shared inmate record, generate a hold request based on the results of the local and extended search, and update the local inmate record and the shared inmate record to indicate the hold request.

In some embodiments, the processor is configured to receive a release request, execute a local and extended search using the release request and a link between a local inmate record and a shared inmate record, populate a release record using the results of the local and extended search, and update the local inmate record and the shared inmate record to indicate the release request.

In some embodiments, the inmate record has a plurality of fields comprising a global identifier and name data, the shared storage device storing an inmate phonetic key record linked to the inmate record by the global identifier, a phonetic key record linked to the inmate phonetic key by a phonetic key identifier, the inmate phonetic key record comprising a commonality rank, the phonetic key record comprising encoding for transforming the name data into phonetic name data, the processor configured to process an inmate search request comprising search name data for the inmate, generate phonetic search name data, determine that the phonetic search name data matches the phonetic name data within the commonality rank, return the inmate record, and populate the booking record using the inmate record.

In some embodiments, the shared storage device stores an alias record having alias data, the alias record linked to the inmate record by the global identifier, the processor configured to generate phonetic alias data, determine that the phonetic search name data matches the phonetic alias data within the commonality rank, return the inmate record, and populate the booking record using the inmate record.

In some embodiments, the shared storage device stores a diminutive record having diminutive data and actual name data, the actual name data of the diminutive record linked to the name data of the inmate record, the processor configured to generate phonetic diminutive data, determine that the phonetic search name data matches the phonetic diminutive data within the commonality rank, return the inmate record, and populate the booking record using the inmate record.

In some embodiments, the inmate record has a plurality of fields comprising a global identifier and name data, the shared storage device storing an alias record linked to the inmate record by the global identifier, the alias record having alias data, the processor configured to process an inmate search request comprising search name data for the inmate, determine that the search name data matches the alias data, return the inmate record, and populate the booking record using the inmate record.

In some embodiments, the inmate record has a plurality of fields comprising a global identifier and name data, the shared storage device storing a diminutive record having diminutive data and actual name data, the diminutive record linked to the inmate record by the actual name data of the diminutive record and the name data of the inmate record, the processor configured to process an inmate search request comprising search name data for the inmate, determine that the search name data matches the diminutive data, return the inmate record, and populate the booking record using the inmate record.

In some embodiments, the processor is configured to synchronize the data storage device storing the plurality of inmate records and the plurality of facility records with updated data from the multiple disparate facility systems.

In some embodiments, the processor is configured to synchronize the data storage device by receiving an election to participate in data sharing from a first facility system, storing a new facility record for the first facility system, loading additional data from the first facility system, translating the additional data into a common schema to update the plurality of inmate records, and creating a new queue record for a scheduler to continuously check the first facility system for further data over a time period.

In some embodiments, the processor is configured to synchronize the data storage device using an application programming interface between a client interface at a first facility system and a cloud interface at the data storage device.

In some embodiments, the processor is configured to synchronize the data storage device by assigning unique global identifiers that are used for records of the disparate facility systems and the data storage device.

In accordance with another aspect, there is provided a process for an inmate facility management system. The process involves: storing, on a shared storage device, a plurality of inmate records and a plurality of facility records from multiple disparate facility systems; receiving, at a processor, a search request for an open bed in a facility system for an inmate; translating data from the multiple disparate facility systems to the plurality of inmate records and the plurality of facility records; determining, at the processor in real time, a set of open beds for an aggregated jail capacity using the plurality of inmate records and the plurality of facility records from the multiple disparate facility systems; updating an interface to indicate the set of open beds for the aggregated jail capacity; receiving a booking request to book the open bed from the set of open beds; updating an inmate record of the plurality of inmate records corresponding to the inmate and a facility record of the plurality of facility records corresponding to the facility system; populating a booking record for the open bed using the inmate record and the facility record; and updating the interface to display the booking request, the inmate record and the facility record.

In some embodiments, the process involves processing the booking request by executing a local and extended search using a link between a local inmate record and a shared inmate record, populating the booking record using the results of the local and extended search, and updating the local inmate record and the shared inmate record to indicate the booking record.

In some embodiments, the process involves receiving a warrant request, executing a local and extended search using the warrant request and a link between a local inmate record and a shared inmate record, generating a hold request based on the results of the local and extended search, and updating the local inmate record and the shared inmate record to indicate the hold request.

In some embodiments, the process involves receiving a release request, executing a local and extended search using the release request and a link between a local inmate record and a shared inmate record, populating a release record using the results of the local and extended search, and updating the local inmate record and the shared inmate record to indicate the release request.

In some embodiments, the process involves generating the inmate record with a global identifier and name data, storing an inmate phonetic key record linked to the inmate record by the global identifier, a phonetic key record linked to the inmate phonetic key by a phonetic key identifier, the inmate phonetic key record comprising a commonality rank, the phonetic key record comprising encoding for transforming the name data into phonetic name data, processing an inmate search request comprising search name data for the inmate, generating phonetic search name data, determining that the phonetic search name data matches the phonetic name data within the commonality rank, returning the inmate record, and populating the booking record using the inmate record.

In some embodiments, the process involves storing an alias record having alias data, the alias record linked to the inmate record by the global identifier, generating phonetic alias data, determine that the phonetic search name data matches the phonetic alias data within the commonality rank, returning the inmate record, and populating the booking record using the inmate record.

In some embodiments, the process involves storing a diminutive record having diminutive data and actual name data, the actual name data of the diminutive record linked to the name data of the inmate record, generating phonetic diminutive data, determining that the phonetic search name data matches the phonetic diminutive data within the commonality rank, returning the inmate record, and populating the booking record using the inmate record.

In some embodiments, the process involves generating the inmate record with a global identifier and name data, the shared storage device storing an alias record linked to the inmate record by the global identifier, the alias record having alias data, the processor configured to process an inmate search request comprising search name data for the inmate, determine that the search name data matches the alias data, return the inmate record, and populate the booking record using the inmate record.

In some embodiments, the process involves generating the inmate record with a global identifier and name data, storing a diminutive record having diminutive data and actual name data, the diminutive record linked to the inmate record by the actual name data of the diminutive record and the name data of the inmate record, processing an inmate search request comprising search name data for the inmate, determining that the search name data matches the diminutive data, return the inmate record, and populating the booking record using the inmate record.

In some embodiments, the process involves synchronizing the data storage device storing the plurality of inmate records and the plurality of facility records with updated data from the multiple disparate facility systems.

In some embodiments, the process involves synchronizing the data storage device by receiving an election to participate in data sharing from a first facility system, storing a new facility record for the first facility system, loading additional data from the first facility system, translating the additional data into a common schema to update the plurality of inmate records, and creating a new queue record for a scheduler to continuously check the first facility system for further data over a time period.

In some embodiments, the process involves synchronizing the data storage device using an application programming interface between a client interface at a first facility system and a cloud interface at the data storage device.

In some embodiments, the process involves synchronizing the data storage device by assigning unique global identifiers that are used for records of the disparate facility systems and the data storage device.

In another aspect, there is provided an inmate facility management device having an interface to access a shared storage device storing a plurality of inmate records and a plurality of facility records from multiple disparate facility systems, and receive a search request for an open bed in a facility system for an inmate; and a processor configured to: translate data from the multiple disparate facility systems to the plurality of inmate records and the plurality of facility records; determine in real time a set of open beds for an aggregated jail capacity using the plurality of inmate records and the plurality of facility records from the multiple disparate facility systems; update the interface to indicate the set of open beds for the aggregated jail capacity; receive a booking request to book the open bed from the set of open beds; update an inmate record of the plurality of inmate records corresponding to the inmate and a facility record of the plurality of facility records corresponding to the facility system; populate a booking record for the open bed using the inmate record and the facility record; and update the interface to display the booking request, the inmate record and the facility record.

In another aspect, there is provide an inmate facility management system with: a shared storage device to store a plurality of inmate records from multiple disparate facility systems, a plurality of inmate phonetic key records, a plurality of phonetic key records, wherein an inmate record has a global identifier and name data, wherein an inmate phonetic key record has the global identifier, a phonetic key identifier and a commonality rank, wherein a phonetic key record has the phonetic key identifier and encoding for transforming the name data into phonetic name data; an interface to receive a search request for an inmate in a facility system, the search request having search name data for the inmate; and a processor configured to: translate data from the multiple disparate facility systems to the plurality of inmate records; process in real time the inmate search request, generate phonetic search name data, determine that the phonetic search name data matches the phonetic name data within the commonality rank, return the inmate record from the plurality of inmate records of the multiple disparate facility systems; and update the interface to indicate the inmate record.

In some embodiments, the processor is further configured to: receive a booking request to book an open bed for the inmate; determine the open bed from a set of open beds for an aggregated jail capacity across the disparate facility systems; populate a booking record for the open bed using the inmate record, the booking record having the global identifier; and update the interface to display the booking record.

In some embodiments, the processor is configured to process the booking request by executing a local and extended search using a link between a local inmate record and a shared inmate record, populate a booking record using the results of the local and extended search, and update the local inmate record and the shared inmate record to indicate the booking request.

In some embodiments, the processor is configured to receive a warrant request, execute a local and extended search using the warrant request and a link between a local inmate record and a shared inmate record, generate a hold request based on the results of the local and extended search, and update the local inmate record and the shared inmate record to indicate the hold request.

In some embodiments, the processor is configured to receive a release request, execute a local and extended search using the release request and a link between a local inmate record and a shared inmate record, populate a release record using the results of the local and extended search, and update the local inmate record and the shared inmate record to indicate the release request.

In some embodiments, the shared storage device stores an alias record having alias data, the alias record linked to the inmate record by the global identifier, the processor configured to generate phonetic alias data, determine that the phonetic search name data matches the phonetic alias data within the commonality rank, return the inmate record, and populate the booking record using the inmate record.

In some embodiments, the shared storage device stores a diminutive record having diminutive data and actual name data, the diminutive record linked to the inmate record by the actual name data of the diminutive record and the name data of the inmate record, the processor configured to generate phonetic diminutive data, determine that the phonetic search name data matches the phonetic diminutive data within the commonality rank, return the inmate record, and populate the booking record using the inmate record.

In some embodiments, the inmate record has a plurality of fields comprising a global identifier and name data, the shared storage device storing an alias record linked to the inmate record by the global identifier, the alias record having alias data, the processor configured to process an inmate search request comprising search name data for the inmate, determine that the search name data matches the alias data, return the inmate record, and populate the booking record using the inmate record.

In some embodiments, the inmate record has a plurality of fields comprising a global identifier and name data, the shared storage device storing a diminutive record having diminutive data and actual name data, the diminutive record linked to the inmate record by the actual name data of the diminutive record and the name data of the inmate record, the processor configured to process an inmate search request comprising search name data for the inmate, determine that the search name data matches the diminutive data, return the inmate record, and populate the booking record using the inmate record.

In some embodiments, the processor is configured to synchronize the data storage device storing the plurality of inmate records and the plurality of facility records with updated data from the multiple disparate facility systems.

In some embodiments, the processor is configured to synchronize the data storage device by receiving an election to participate in data sharing from a first facility system, storing a new facility record for the first facility system, loading additional data from the first facility system, translating the additional data into a common schema to update the plurality of inmate records, and creating a new queue record for a scheduler to continuously check the first facility system for further data over a time period.

In some embodiments, the processor is configured to synchronize the data storage device using an application programming interface between a client interface at a first facility system and a cloud interface at the data storage device.

In some embodiments, the processor is configured to synchronize the data storage device by assigning unique global identifiers that are used for records of the disparate facility systems and the data storage device.

In another aspect, there is provided an inmate facility management system with a shared storage device to store a plurality of inmate records from multiple disparate facility systems, an alias record having alias data, and a diminutive record having diminutive data and actual name data, the inmate record having a global identifier and name data, the alias record linked to the inmate record by the global identifier, the diminutive record linked to the inmate record by the actual name data of the diminutive record and the name data of the inmate record; an interface to receive a search request for an inmate in a facility system, the search request having search name data for the inmate; a processor configured to: translate data from the multiple disparate facility systems to the plurality of inmate records; process in real time the inmate search request, determine that the search name data matches the alias data or the diminutive data, return the inmate record from the plurality of inmate records of the multiple disparate facility systems; and update the interface to indicate the inmate record.

In some embodiments, the processor is further configured to: receive a booking request to book an open bed for the inmate; determine the open bed from a set of open beds for an aggregated jail capacity across the disparate facility systems; populate a booking record for the open bed using the inmate record, the booking record having the global identifier; and update the interface to display the booking record.

In some embodiments, the processor is configured to process the booking request by executing a local and extended search using a link between a local inmate record and a shared inmate record, populate a booking record using the results of the local and extended search, and update the local inmate record and the shared inmate record to indicate the booking request.

In some embodiments, the processor is configured to receive a warrant request, execute a local and extended search using the warrant request and a link between a local inmate record and a shared inmate record, generate a hold request based on the results of the local and extended search, and update the local inmate record and the shared inmate record to indicate the hold request.

In some embodiments, the processor is configured to receive a release request, execute a local and extended search using the release request and a link between a local inmate record and a shared inmate record, populate a release record using the results of the local and extended search, and update the local inmate record and the shared inmate record to indicate the release request.

In some embodiments, the processor is configured to synchronize the data storage device storing the plurality of inmate records and the plurality of facility records with updated data from the multiple disparate facility systems.

In some embodiments, the processor is configured to synchronize the data storage device by receiving an election to participate in data sharing from a first facility system, storing a new facility record for the first facility system, loading additional data from the first facility system, translating the additional data into a common schema to update the plurality of inmate records, and creating a new queue record for a scheduler to continuously check the first facility system for further data over a time period.

In some embodiments, the processor is configured to synchronize the data storage device using an application programming interface between a client interface at a first facility system and a cloud interface at the data storage device.

In some embodiments, the processor is configured to synchronize the data storage device by assigning unique global identifiers that are used for records of the disparate facility systems and the data storage device.

In some embodiments, the storage device stores an inmate phonetic key record having the global identifier, a phonetic key identifier and a commonality rank, the storage device stores a phonetic key record having the phonetic key identifier and encoding for transforming the name data into phonetic name data, wherein the processor is configured to generate phonetic alias data, determine that the phonetic search name data matches the phonetic alias data within the commonality rank, return the inmate record, and populate the booking record using the inmate record, a plurality of inmate phonetic key records, a plurality of phonetic key records the processor configured to generate phonetic diminutive data, determine that the phonetic search name data matches the phonetic diminutive data within the commonality rank, return the inmate record, and populate the booking record using the inmate record.

In some embodiments, the inmate facility management system is configured to receive a booking request, execute a local and extended search using the booking request and a link between a local inmate record and a shared inmate record, populate a booking record using the results of the local and extended search, and update the local inmate record and the shared inmate record to indicate the booking request.

In some embodiments, the inmate facility management system is configured to receive a warrant request, execute a local and extended search using the warrant request and a link between a local inmate record and a shared inmate record, generate a hold request based on the results of the local and extended search, and update the local inmate record and the shared inmate record to indicate the hold request.

In some embodiments, the inmate facility management system is configured to receive a release request, execute a local and extended search using the release request and a link between a local inmate record and a shared inmate record, populate a release record using the results of the local and extended search, and update the local inmate record and the shared inmate record to indicate the release request.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 13 is a screenshot of an example graphical user interface with alert records according to some embodiments;

FIG. 15 is a screenshot of an example graphical user interface of inmate results according to some embodiments;

FIGS. 17A, 17B, 17C, 17D are diagrams of data structures and links for data synchronization according to some embodiments.

DETAILED DESCRIPTION

Embodiments of methods, systems, and apparatus are described through reference to the drawings.

Figure 1:
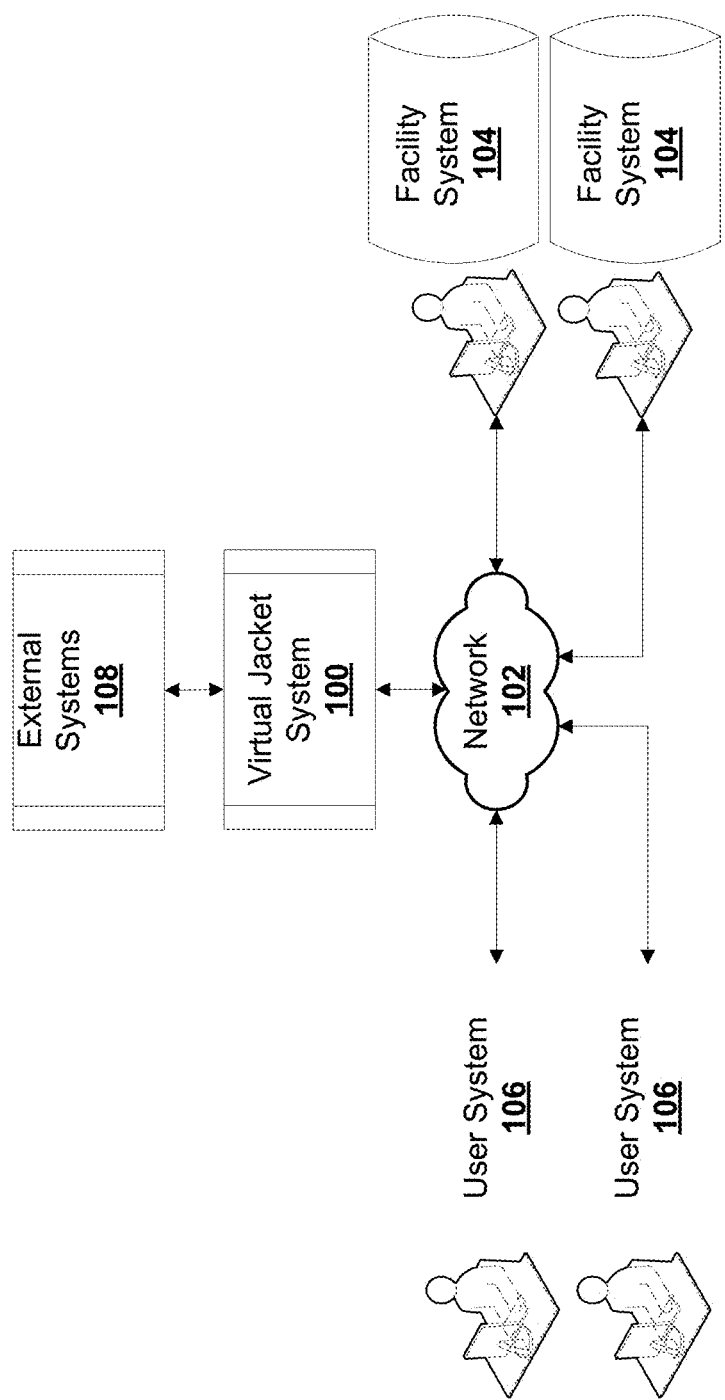
FIG. 1 is a view of a virtual jacket system according to some embodiments.

FIG. 1 shows a virtual jacket system 100 for shared data storage across disparate jail facility systems 104. A facility system 104 may manage inmate workflows for a correction facility, jail detention centre, prisons, penitentiary, remand centre, and the like. The virtual jacket system 100 synchronizes and combines different data collections for the multiple facility systems 104. The virtual jacket system 100 provides data sharing, capacity management, release and hold control of inmates, and other functionality. The virtual jacket system 100 has capacity bid-auction tools for managing available rooms and beds across the jail facility systems 104. The virtual jacket system 100 has capacity bid-auction tools for managing available rooms and beds aggregated across multiple jail facility systems 104. Correction facility staff or administrators operate user system 106 to access the virtual jacket system 100 and their local facility system 104 via network 102. A facility system 104 can have a local data set and an expanded data set with a connection to virtual jacket system 100. The expanded data set can include data from other jail facility systems 104 to extend the local data set, for example.

When a prior booking record for an offender exists in the electronic virtual jacket system 100 fewer man hours are required to safely and effectively intake the offender and the resulting record is more complete and accurate. Labor intensive data entry can be reduced by efficiently transforming much of the data contained in the prior record to the new record, or linking the prior record to the new record. Data integrity can be increased as multiple records may be merged by virtual jacket system 100 into a master record for the offender. The virtual jacket system 100 flags inaccurate, expired and inconsistent data populating the offender record using data verification rules and natural language processing. The virtual jacket system 100 sends a notification to user system 106 or facility system 104 for review and verification.

When each electronic facility system 104 operates in an isolated silo, corrections facility staff members do not gain this same level of access and efficiency. If an offender has been previously booked then virtual jacket system 100 can access data from a neighboring jail or other remote corrections facility system 104. In known systems, data entry begins from a blank slate or is limited to local information of a previous incarceration from the local facility system 104. The additional time for data entry often results in decreased attention to the offender or an elevated number of staff required on duty. This may also lead to increased levels of human error in a high stress environment, and an increased ability for an offender to give false, incomplete or incorrect information.

Similar issues exist at the time an offender is released and back into the public. The release process includes searching for active warrants and hold requests (detainers) from other agencies or facility systems 104. These steps require timeliness and availability of relevant data. Offenders might be released with outstanding warrants from other neighboring local or state jurisdiction facilities. This requires additional effort and resources from law enforcement to verify release status. Releasing an inmate that should be held for another crime or jurisdiction dramatically increases risks to the public. A potentially violent offender might be released rather than be transferred and held for other crimes at another facility. Even when detainees are in place and identified, the transfer process in this hold and transport scenario requires extensive data entry as there is no ability to reuse the data available from the originating facility. The data may also be inaccurate and incomplete. Past inmate history including suicide attempts, mental health issues, aggression and previous incidents can significantly impact inmate, facility officer, and public safety and well-being.

Virtual jacket system 100 aggregates active offender information into a cloud-based data warehouse. Virtual jacket system 100 provides correctional facility systems 104 and user systems 106 with the ability to share critical health and safety information and expedite labour-intensive or error-prone processes. Virtual jacket system 100 provides the ability to search other facility systems 104 active population, as well as being able to leverage the historical data from other jail systems to efficiently populate a new booking record. This greatly reduces data entry time, error and risk that exist in current approaches. This approach reduces critical mistakes for both corrections staff and offenders' safety, working with accurate information regarding the offender's most recent behavior and medical needs. This also affords institutions more time to focus on supervision and rehabilitation of the general population.

Law enforcement agencies also have increased ability to find actively wanted offenders already incarcerated at nearby facilities. Time currently spent on the phone and searching disparate or potentially out-of-date electronic warrant systems is mitigated by the ability to search a centralized and real-time data store. Electronic hold requests not only reduce the time spent to request the detainer, but also facilitate the booking process at the destination facility, as the data originates from a common system.

The cloud-based data sharing and exchange improves facilities management and jail capacity management across multiple participating facilities and/or jurisdictions. The search process can afford greater transparency and manage jail or bed capacity at an aggregated level. The virtual jackets system 100 implements capacity management and enables automated transfer of inmates throughout a region or across multiple autonomous jail facilities. This may reduce overall costs as well as overcrowding at select facilities. The technology provides visibility into available capacity across a collection of independent facilities and enable that capacity to be offered for inmate housing based on their special and specific needs and characteristics. This aggregated capacity management also affords other external agencies (external systems 108) an opportunity to arbitrage and bid on excess capacity thru a reverse auction or bid process for available capacity to maximize overall the bed utilization and reduce overall costs without requiring additional facilities or increased bed capacity at any one agency or jurisdiction.

The virtual jacket system 100 can connect to external systems 108 to transmit reports based on inmate data and other data from facility systems 104 and receive data. For example, the external systems 108 may be a government system and virtual jacket system 100 generates report for social security, health and so on by processing inmate data from facility systems 104. The virtual jacket system 100 implements data integration to aggregate data at different levels (e.g. state level, region level, organization level).

The virtual jacket system 100 provides a web based API for access to its data warehouse. The virtual jacket system 100 is a service for booking and releasing inmates using facility system 104. The virtual jacket system 100 manages capacity for facility system 104 across a geographic area. The virtual jacket system 100 identifies facilities and services for special needs issues and provides a search interface for search and report requests.

Figure 2:
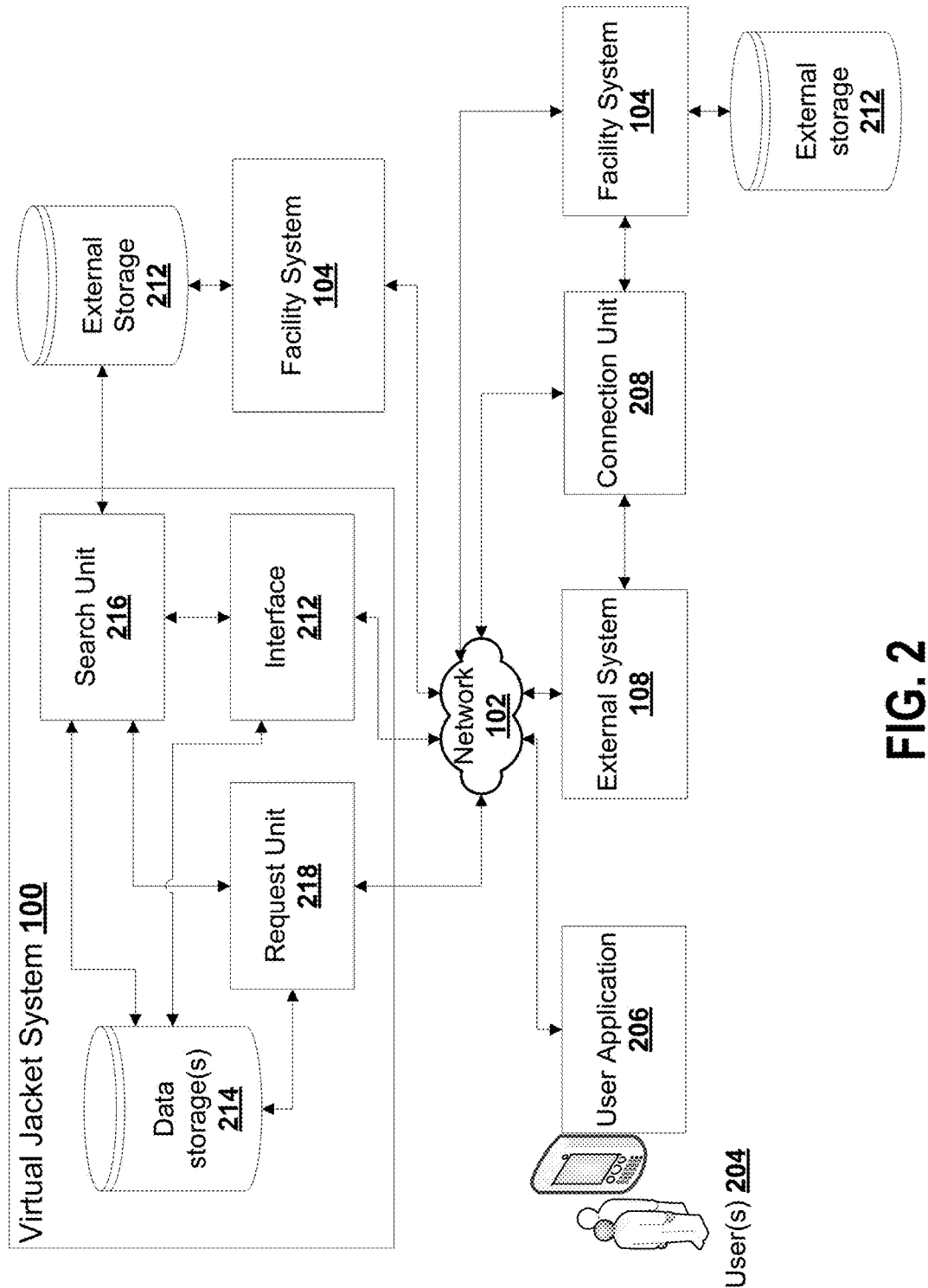
FIG. 2 is a view of another example virtual jacket system according to some embodiments.

FIG. 2 is a view of another example virtual jacket system 100 according to some embodiments.

Virtual jacket system 100 has data storage 214 for storing aggregated inmate records populated with data from facility systems 104 through interface 212. Virtual jacket system 100 has a processor executing instructions in data storage 214 to configure a request unit 218 and a search unit 216. The request unit 218 responds to data requests from user application 206, external system 108, and facility system 104.

The interface 212 has a translation layer to translate input data into the data schema for the data storage 214. The data schema describes the entities involved in the inmate management workflow. The data storage 214 may store the data flat. Multiple facility data sets are described using the same data schema when imported into the cloud warehouse using the API for virtual jacket system 100.

The virtual jacket system 100 generates and manages offender records and facility records for multiple facility systems 104. The virtual jacket system 100 relates multiple offender instances across different geographical areas to aggregate the data. In some embodiments, the virtual jacket uses a global identifier for offender instances to links to booking instances. Search unit 216 searches historical data to detect if there is the same offender. Search unit 216 uses a search process to execute queries and locate relevant offender instances. Request unit 218 responds to search and data import requests received from facility system 104 and user applications 106 to trigger search unit 216.

A facility system 104 runs a virtual jacket application to connect to the virtual jacket system 100. The facility system 104 runs a local search based on a local inmate and operations data set stored in its local storage or external storage 212. The facility system 104 also runs a virtual jacket search based on an extended data set from virtual jacket system 100 and its data storage 214. The virtual jacket system 100 enhances the search data set for facility system 104. The virtual jacket system 100 can transfer data to facility system 104 to updates its local storage or external storage 212 in response to control commands. The virtual jacket system 100 links inmate records to local inmate records in local storage or external storage 212 using an identifier or reference. The virtual jacket system 100 checks for inaccurate, incomplete or expired data in local inmate records. The virtual jacket system 100 sends a notification to facility system 104. The search may be based on inmate's name, including sounds, language variants, aliases, street names, nick names, and so on.

Searching for records in an electronic system based on a person's name and pedigree information is a complex task. This becomes even more complex when dealing with data sets created, stored and updated by different, independent systems. Identification can be facilitated with ID cards, such as Driver Licenses or Passports. However, working with offenders within a jail facility, ID cards are often not available, and corrections facility staff must use verbally-stated and observable cues instead. This can create a varied data set that includes both informal names and formal names, for example. A search process can expand the search terms to identify relevant records. The search unit 216 provides a search API and data modelling that helps solve this problem in several ways including the use of phonetic encoding an alias names, for example. The search unit 216 can implement string or character searches and can also implement phonetic searching.

Phonetics pose an issue when correctly spelling a person's verbally spoken last name. There are many pre-existing algorithms developed by linguists that attempt to address this issue using the phonetic attributes of worldwide languages and dialects. These algorithms can encode a last name into a phonetically invariant string. In theory, encoding two or more names with these algorithms, those that are spelled differently but are phonetically akin, should produce the same encoding. As a result, searching by the encoding instead of the misspelled name produces the match. Search processes may vary depending on its best-encoded languages and rate of false positives on phonetic matches. Generally, systems might produce only two distinct encodings (double metaphone). Hence, the encodings might typically be stored alongside a last name as additional column(s) in a traditional database system.

In some embodiments, the virtual jacket system 100 (and the search unit 216) can apply a different storage and search approach. Each last name can be encoded against each algorithm or encoding, resulting in a variant number of phonetic keys for each name. Instead of columns accompanying the pedigree data, these keys are instead stored in rows of a child table related to the person's main data record. Each encoding is paired with a numeric weighting factor that defines the commonality of the encoding. Each search begins by encoding the searched last name, resulting in one or more keys. The virtual jacket system 100 can use a search that joins the person table with the phonetic keys table, and filters through an OR'ed list of the searched name's encoded keys. The matching results are then returned and sorted by the weighting factor, providing the most common matches at the top of the results list. Accordingly, the weighting factor can be generated based on the commonality rank or similarity measurement.

A different problem can be exposed regarding first names, as people are known by, or prefer to be called by, shortened (diminutive) versions of their given name. For example, Charles is often shortened to Charlie, Charley or Chuck. In some embodiments, the Virtual Jacket search unit 216 implements an extensible database table that pairs together full given names with their common variations. Similar to the last name, the search joins and filters the person table with the diminutives table, matching the searched first name to either the full or diminutive version of the searched first name. As a result, searching by any of Charlie, Charley, Chuck or Charles will find a record stored in the system as any of these variations.

Beyond diminutive names, people are often given nicknames, or operate under one or more aliases. Following a similar one-to-many relational database pattern, Virtual Jacket search unit 216 stores nicknames and aliases as rows in a child table related to the person data. Though the search screen provides a separated Alias search term, the user may not be aware they were given an alias. To guard against this, unless the Alias search term is explicitly provided, Virtual Jacket System 100 implements a search technique that assumes the searched name may also be an alias, and joins the alias table with the person table by the person record's identifier, ORing an additional search term to potentially match the alias with the searched name.

Human factors, such as miss keyed data either at the time of data entry or at search, also play an important factor in accurately identifying existing information in an electronic system. The Virtual Jacket search unit 216 may apply a weight factor to the encoded last names as criteria. Damerau-Levenshtein Distance (Edit Distance) is a calculation that can be applied to two strings resulting in a numeric value denoting how identical they are. Four operations are allowed as the characters from the two strings are compared: insertion (extra letter), deletion (missing letter), substitution (different letter), and transposition (out-of-order letters). These operations carry different weights based on how common the mistake is amongst humans, and summed provide a total distance apart for the two strings. A postprocessor on the Virtual Jacket search unit 216 results calculates the edit distance of the searched last name to each last name included in the search results.

Edit distance would ideally also be applied to first name and alias search terms. Since both search filter operations are currently applied as exact matches instead of phonetic encodings, such as the last name approach, some potential matches may currently still be missed. Though database engines have advanced to allow algorithms to be coded externally and linked into the query engine, such as SQL Server CLR Integration, calculation-intensive actions performed dynamically on a row-by-row basis across an entire result set severely degrades query performance. It is theoretically possible to load the necessary data entirely into memory as a search tree. Instead of searching via the database engine, the search would occur entirely in-memory, also applying these calculations dynamically. The size of the search tree for an entire system's person data may require additional RAM to store it. However, once feasible, including first or diminutive names as well as aliases and nicknames that fall within a given tolerance would also assist finding miss keyed and misheard data.

Though the system provides individual fields for first, last and middle names, when it comes to data from external sources, a system can neither rely on such granularity of the name data, nor the consistency to which the data is formatted or ordered. Many systems often provide the name as a single string, some with comma-separated last-name first, some with spaced first-name first. To solve this, a name parsing process is included in the search API that is available to the external data translation layer. The parser accepts a full name in any format, and provides last, first, middle, suffix (Jr., Sr., III, et al.) and title (Mr., Mrs., Dr., et al.) data elements that are separated as a result file. The parser also detects common multi-token patterns found in last names of many heritages, such as Von, Van Der, and Bin. Through this, names such as Ludwig Von Beethoven, Osama Bin Laden, and Johannes Van Der Waals are properly identified as only first and last names. Many processes naïve of this pattern improperly identify Von, Bin and Van Der (or possibly only Van) as middle names. Double-word first names are difficult to detect apart from a middle name, such as Billy Bob or Mary Lou. An extensible dictionary of common double-word names similar to the diminutives approach, or providing the possibility of multiple results from the parser such that Billy Bob results in a first name only result and first +middle name, would both assist solving this issue.

Referring to the weighting system applied by search unit 216 as a post-processor to the search results, the phonetic commonality and the edit distance can be calculated into the weight. As such, the highest-ranking results are properly spelled and sound most similar. However, a match with the correct additional data point(s), such as an SSN, DOB, DOB and Birth Place, or Driver License Number, might be ranked much lower given poor spelling or a less-common phonetic variance. The post-processor would benefit further by giving rows penalty weights for missing or mismatched data in fields compared where search terms are available. Weighted this way, rows with matches in each data point would hit the top of the result set, instead of simply relying on the weights of the name data.

Perhaps most importantly, images associated with the electronic records are provided so that the corrections facility staff may visually associate the electronic record with the offender they are processing. Images, combined with other data points such as height, gender, ethnicity et al. provide final confirmation to the user that they have identified the correct pre-existing electronic record.

Figure 3:
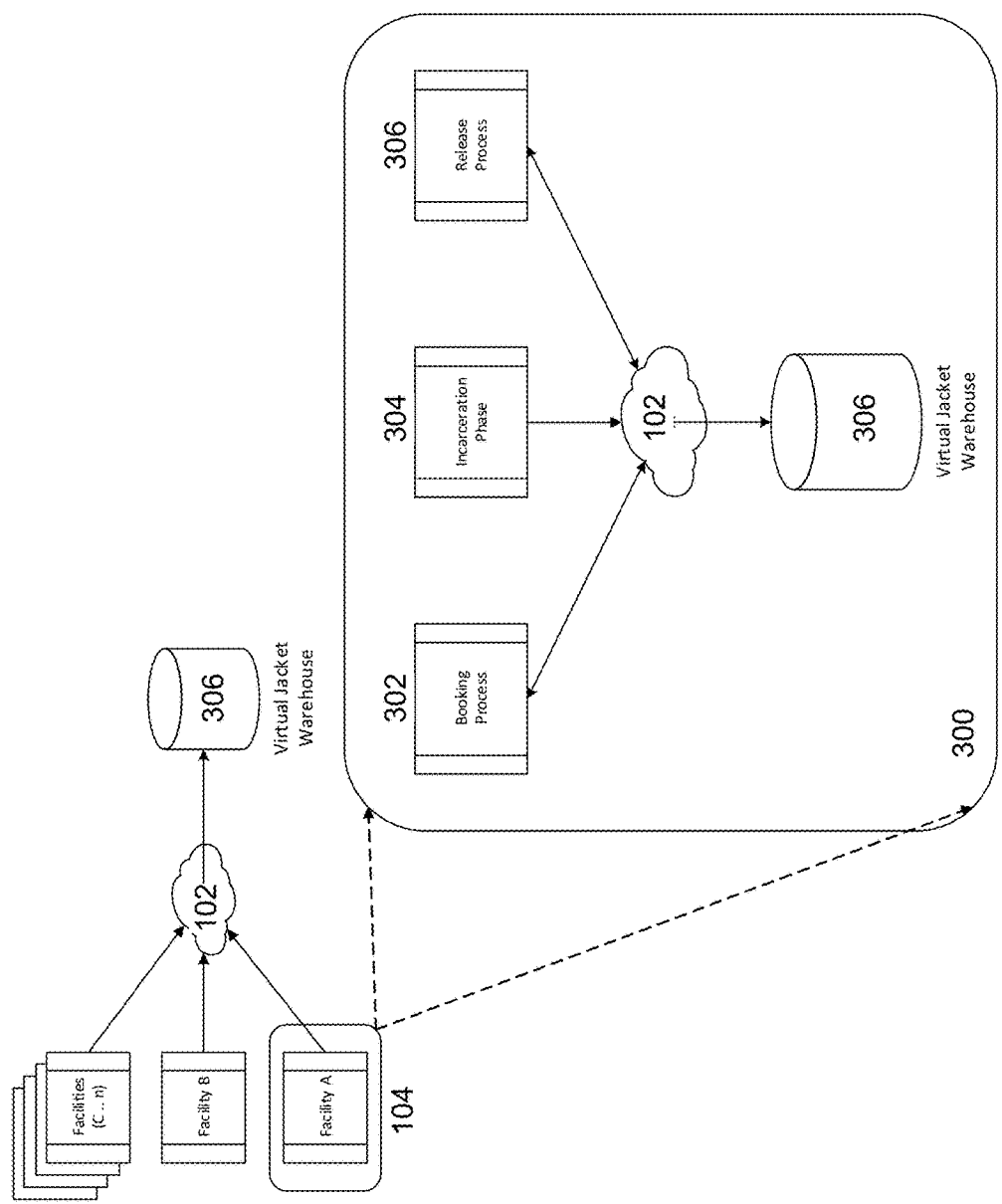
FIG. 3 is a view of a further example virtual jacket system according to some embodiments.

FIG. 3 is a view of an example virtual jacket application 300 according to some embodiments. Facility system 104 runs a virtual jacket application 300 as an interface to virtual jacket warehouse 306 via network 102. The virtual jacket application 300 has a booking process 302, incarceration process 304, and a release process 306.

Figure 4:
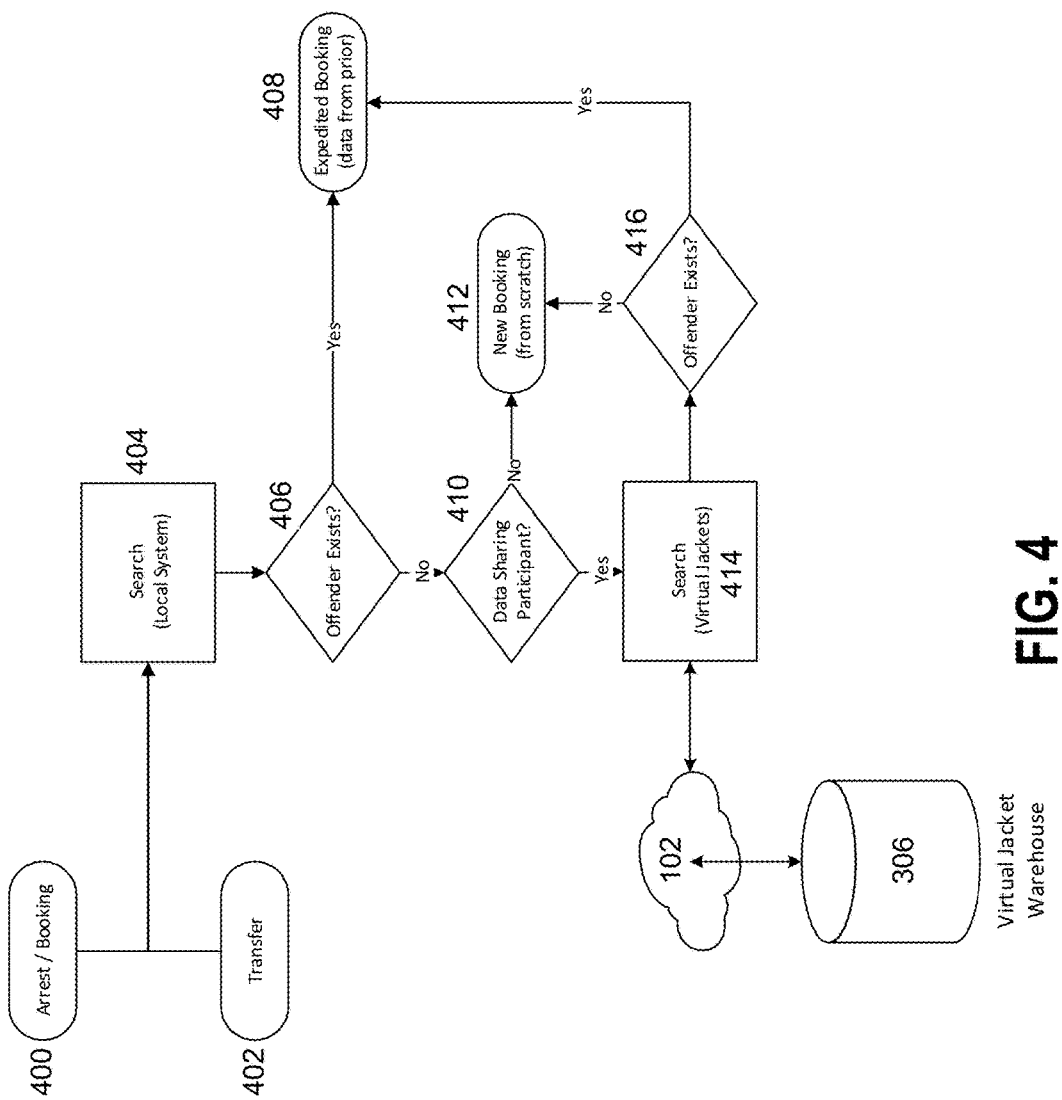
FIG. 4 is a flowchart of a process for a booking according to some embodiments.

FIG. 4 is a flowchart of a process 400 fora booking an inmate using a facility system 104 and virtual jacket system 100 according to some embodiments. FIG. 4 also shows a process 402 for transferring an inmate.

At 404, facility system 104 receives a booking request for an offender. In response, facility system 104 executes a local search for inmate data or other data relating to the booking and facility, including available capacity. The booking request may include special needs of the offender.

At 406, facility system 104 determines whether an inmate record or instance exists for the offender in the booking request. If so, at 408, facility system 104 expedites booking by populating the booking record by copying historical data form the prior inmate record. The booking record is linked to the inmate record. The historical data form the prior inmate record may be part of the facility system 104 local data set for the extended data set for virtual jacket system 100.

If the inmate record or instance does not exist for the offender in the booking request, at 410, facility system 104 determines whether the facility system 104 is connected to virtual jacket system 100. If not, at 412, facility system 104 generates a new booking record using input data.

At 414, facility system 104 connects to virtual jacket system 100 to execute an extended search for inmate data or other data relating to the booking and other facilities, including available capacity at neighbouring facilities. The extended search uses data from virtual jacket warehouse 306 populated by multiple facilities. Even if a local inmate record or instance does exists, facility system 104 can connect to virtual jacket system 100 to execute an extended search to expedite the booking process using data from virtual jacket warehouse 306.

Figure 5:
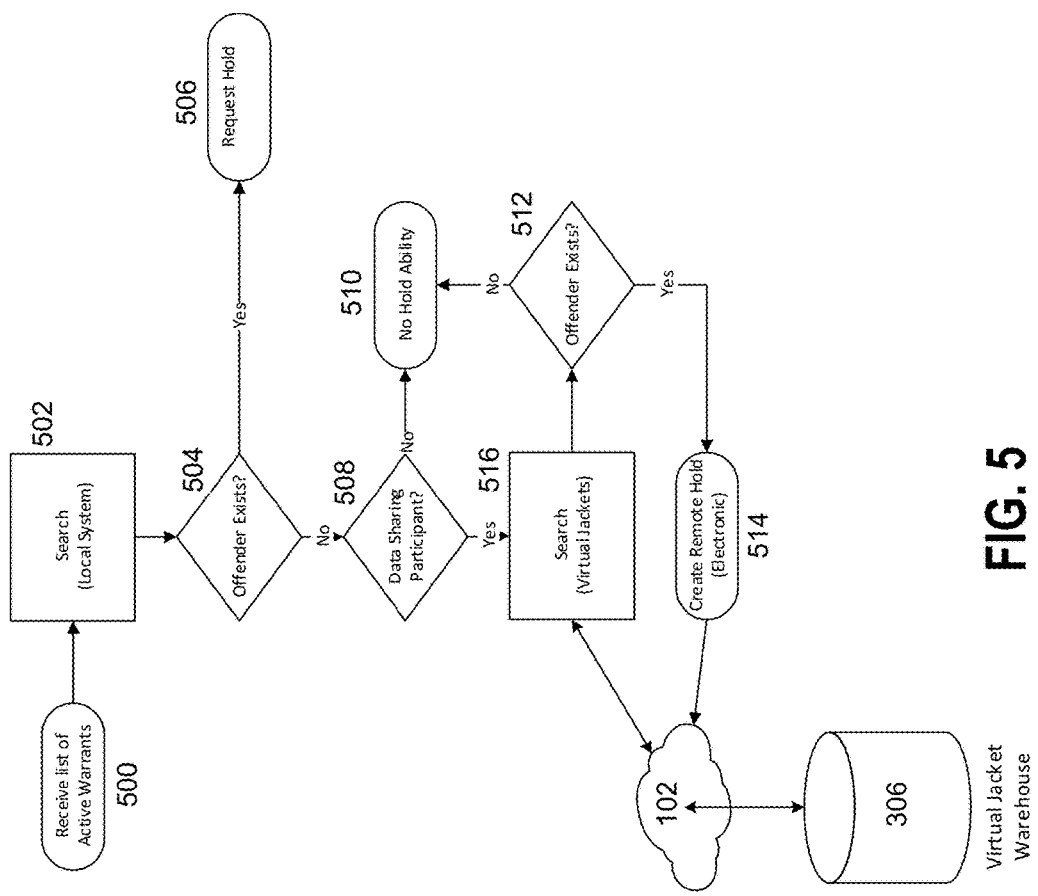
FIG. 5 is a flowchart of a process for receiving a warrant request according to some embodiments.

FIG. 5 is a flowchart of a process 500 for receiving a warrant request according to some embodiments.

At 502, facility system 104 receives a list of active warrants and incarcerations. The warrant request may identify one or more offenders that may be at a facility. In response, facility system 104 executes a local search for inmate data or other data relating to the warrant request.

At 504, virtual jacket system 100 determines that an offender record or instance exists that identifies an offender for the warrant request. At 506, virtual jacket system 100 requests a hold to pick up and transfer the offender. The virtual jacket system 100 generates an electronic hold request and transmits the hold request to the corresponding facility system 104. The virtual jacket system 100 triggers an electronic remote hold that flags the offender for other facility system 104 searches to indicate that there is a warrant request for the offender.

If the inmate record or instance does not exist for the offender in the booking request, at 508, facility system 104 determines whether the facility system 104 is connected to virtual jacket system 100. If not, at 510, facility system 104 indicates that there is no hold ability for the offender in the warrant request.

At 516, facility system 104 connects to virtual jacket system 100 to execute an extended search for inmate data relating to the warrant request. The extended search uses data from virtual jacket warehouse 306 populated by multiple facilities. Even if a local inmate record or instance does exist, facility system 104 can connect to virtual jacket system 100 to execute an extended search inmate data relating to the warrant request. If the virtual jacket system 100 locates inmate record or instance relating to the warrant request, at 514, the virtual jacket system 100 triggers a remote hold for the inmate or an electronic hold flag for other facility search requests.

Figure 6:
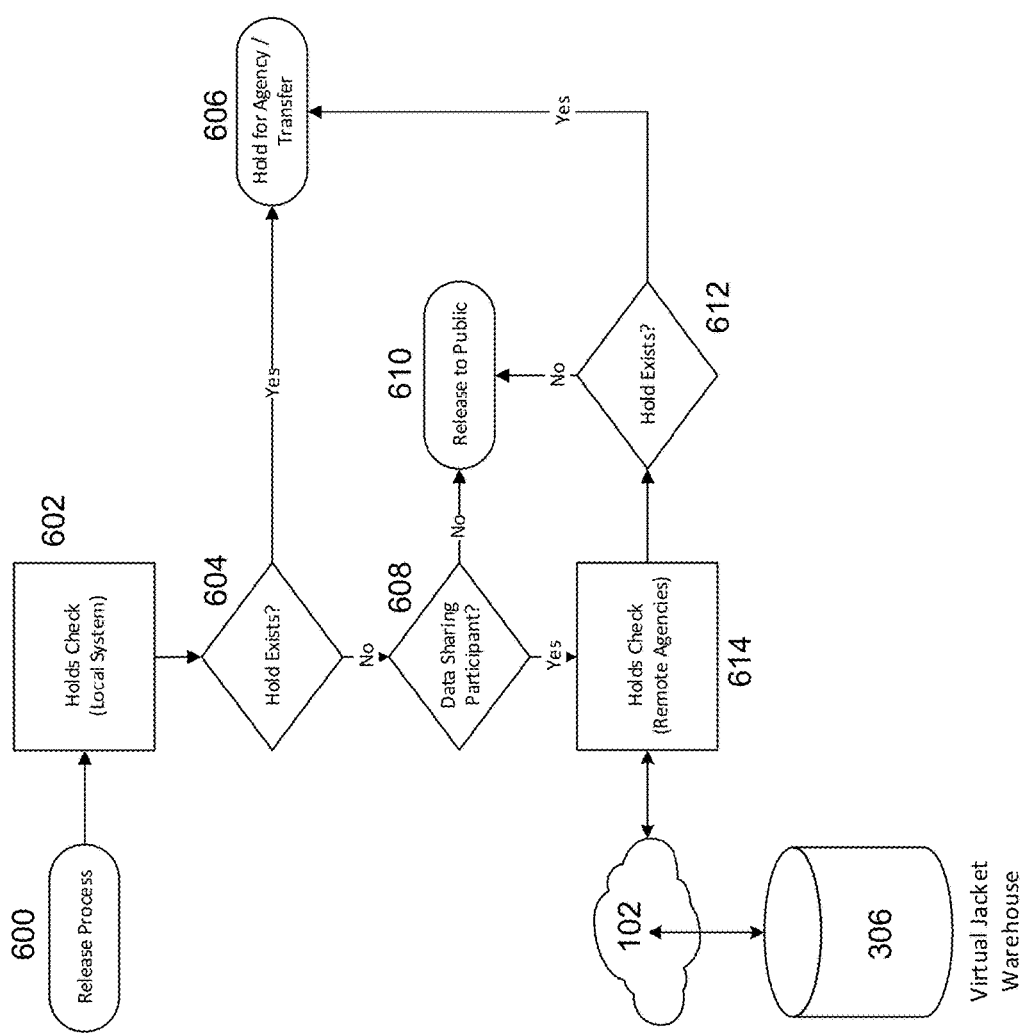
FIG. 6 is a flowchart of a process for a release according to some embodiments.

FIG. 6 is a flowchart of a process 600 fora release according to some embodiments.

At 602, facility system 104 executes a release request for holds relating to an inmate to be released. At 604, the facility system 104 determines whether any electronic hold flags exist for the inmate from the release request. There may be existing holds or active warrants for an offender. If, at 606, the facility system 104 sends a notification to another facility system 104 or agency to transfer the inmate.

At 608, facility system 104 connects to virtual jacket system 100 to execute a release request for any holds relating to the release request. At 614, the virtual jacket system 100 executes an extended search for holds using data from virtual jacket warehouse 306 populated by multiple facilities. Even if a local inmate record or instance exists, facility system 104 can connect to virtual jacket system 100 to execute an extended search inmate data relating to the release request. If the virtual jacket system 100 locates on inmate record or instance relating to the release request, at 606, the facility system 104 sends a notification to another facility system 104 or agency to transfer the inmate. If there are no holds then the offender may be released at 610.

The virtual jacket warehouse 306 updates based on the booking process 400, warrant process 500 and release process 600, results. For example, the virtual jacket system 100 triggers an update to the inmate record of virtual jacket warehouse 306 to indicate new booking, a hold flag and a release event. The virtual jacket system 100 also updates the inmate record based on incidents at the facility. For example, an inmate may be sick or get into a fight, and the like.

The virtual jacket system 100 and the facility systems 104 link inmate records and synchronize the extended data set for the inmate record with the local data set for the inmate record. The virtual jacket system 100 may check the virtual jacket warehouse 306 against the local data to flag inconsistent, inaccurate and expired data. Note to inventors: please provide further details on the synchronization process.

Figure 7:
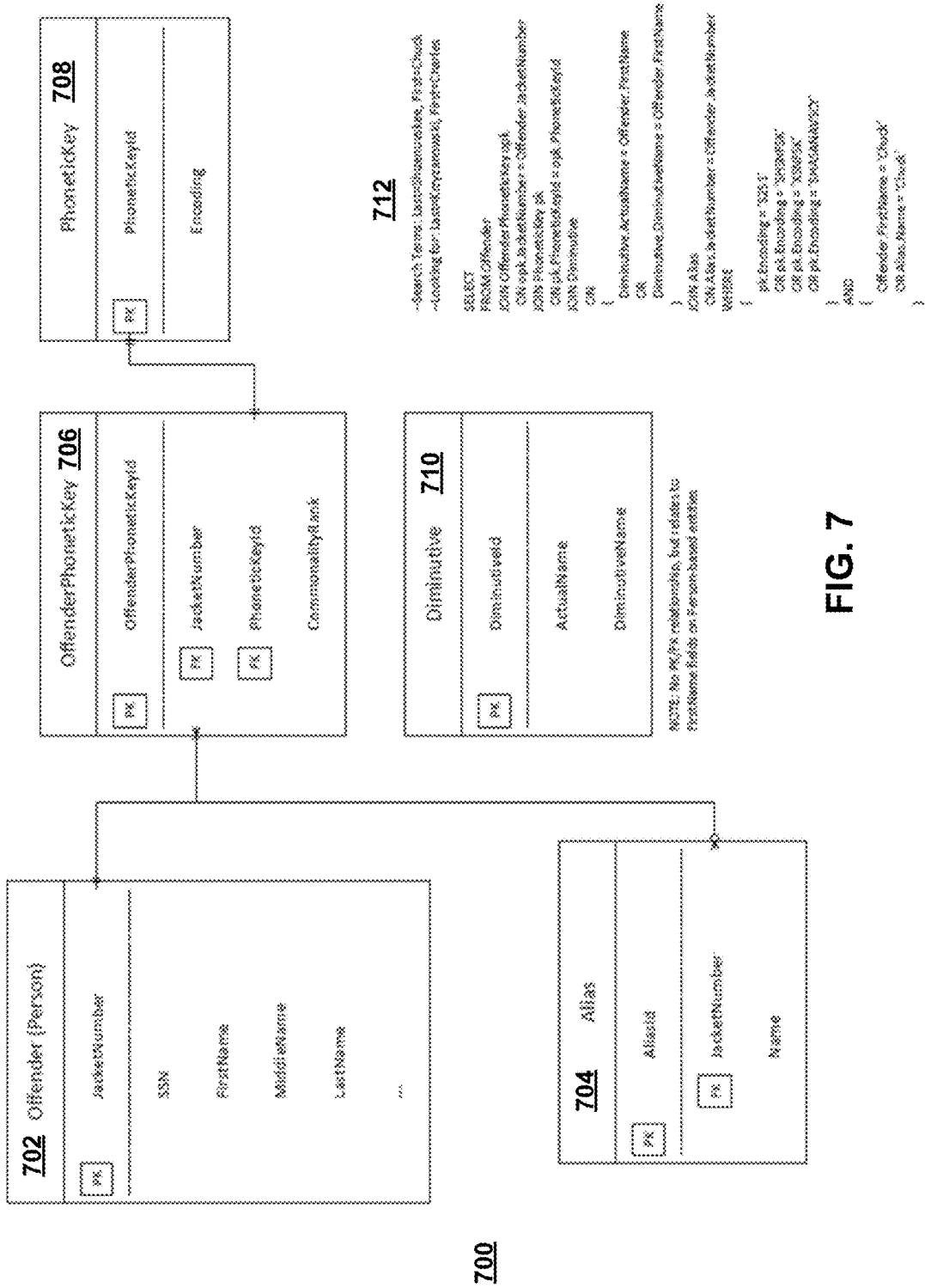
FIG. 7 is a diagram of data structures and links for a search process according to some embodiments.

FIG. 7 is a diagram of data structures 700 and links for a search process according to some embodiments. An offender or inmate record 702 has different fields including a global identifier (JacketNumber), social security or insurance number, first name, middle name, last name, and so on. As noted, an inmate may be identified using different variations for their name, including nicknames, street names, aliases, and so on. An offender phonetic key record 706 links to the inmate record 702 by the JacketNumber, for example. The offender phonetic key record 706 has different fields including offender phonetic key identifier, phonetic key identifier, commonality rank, and so on. A phonetic key record 708 links to the offender phonetic key record 706 by the phonetic key identifier, for example. The phonetic key record 708 includes an encoding field. The encoding is used to generate phonetic data by transforming name data. A diminutive record 710 has different fields including a diminutive identifier that links to a name field of the offender or inmate record 702. An alias record 704 has different fields including an alias identifier, the name and the JacketNumber. Example instructions 712 for a search.

The virtual jacket system 100 receives an inmate search request with search name data for the inmate. The inmate search request can be part of the booking process, hold process, alert process or warrant process, for example. In some embodiments, the virtual jacket system 100 uses a phonetic key record 708 to generate phonetic search name data using encoding. The virtual jacket system 100 can compare the phonetic search name data to phonetic name data to identify similar phonetic name data within the commonality rank. The commonality rank can be a similarity threshold, for example. The virtual jacket system 100 can compare phonetic encoding for the search name data and phonetic encoding for the name data of the inmate record 702 to see if the encodings are similar or common. The commonality rank is used to define the acceptable range of similarity or commonality between the encodings. The commonality rank can be of value or range of values for example. The commonality rank can be defined as of a variance measurement for example. The phonetic encoder receives string or character data as input and generates phonetic encoding as output. The phonetic encoding can be used by virtual jacket system 100 for comparison to other phonetic encoding to identify data that is phonetically similar. The phonetically similar data might not be similar when considering the string are characters of the data alone.

An offender phonetic key record 706 links phonetic name data to a global identifier. An inmate record 702 links the global identifier to name data. The offender phonetic key record 706 has phonetic encoding representing a name. The inmate record has string or character values representing a name. Accordingly, the virtual jacket system 100 uses the global identifier to link the offender phonetic key record 706 with the phonetic encoding corresponding to name data to the inmate record 702 with the string or character values for the name data. The virtual jacket system 100 can populate a booking record using the name data of the inmate record 702, for example. According, the virtual jacket system 100 can determine that the phonetic search name data matches the phonetic name data within the commonality rank and return the inmate record in response. The phonetic search name data and the phonetic name data can be different but still determined to sound phonetically similar enough if within the commonality rank, for example. The commonality rank can define permitted ranges of phonetic variance. The inmate record 702 can be linked to one or more facility records, for example. The virtual jacket system 100 uses phonetic encoding to identify relevant inmate records 702 in response to a search query that might not otherwise be identified using a string or character comparison. For example, a first name might use different strings or characters than a second name but may sound phonetically similar. The virtual jacket system 100 can use the offender phonetic key record 706 to match first name data and second name data based on their phonetic similarity to generate search results. The virtual jacket system 100 can also use string or character comparisons to match the first name data and the second name data to generate search results. Accordingly, the virtual jacket system 100 can identify the first name data and the second name data based on their phonetic similarity which may not otherwise be identified based on string or character similarity.

The inmate record 702 has fields including a global identifier and name data. The virtual jacket system 100 uses a shared storage device to store inmate phonetic key records 706 and inmate records 702. The virtual jacket system 100 links the inmate phonetic key records 706 and inmate records 702 by the global identifier. The virtual jacket system 100 can identify an inmate phonetic key record 706 based a phonetic similarity to name data received as part of a search or query. The virtual jacket system 100 links phonetic key records 708 to inmate phonetic key records 706 by a phonetic key identifier. The inmate phonetic key records 706 include a commonality rank to determining similar phonetic names. A user may enter name incorrectly as a search name but the correct inmate record 702 can be located by the virtual jacket system 100 using the inmate phonetic key records 706 and the phonetic key records 708. The phonetic key records 708 have encoding for transforming the name data into phonetic name data. The virtual jacket system 100 can use the phonetic name data to identify an inmate phonetic key record 706.

An alias record 704 is linked to the inmate record 702 by the global identifier. The alias record has alias data. The system 100 can process an inmate search request with search name data for the inmate, determine that the search name data matches the alias data, return the inmate record, and populate the booking record using the inmate record. The virtual jacket system 100 can use the alias data to generate search results and locate relevant inmate records 702. The virtual jacket system 100 can use the alias record 704 to match alias data to search data based on a similarity measure. The similarity measure can be generated based on string or character similarities. The similarity measure can also be generated based on phonetic similarities. The similarity measure can be referred to as a commonality rank which can be of value or range of values defining permitted variance between two or more compared parameters, for example.

The system 100 can generate phonetic alias data. The system 100 can determine that the phonetic search name data matches the phonetic alias data within the commonality rank, return the inmate record, and populate the booking record using the inmate record. This creates a flexible tool for system 100 to locate relevant inmate records and expands search data to include alias names. The virtual jacket system can use the alias record 704 to match alias data to search data based on a similarity measure that can be generated using phonetic similarity between the alias data and the search name data. As noted, the alias record 704 with the similar alias data can be used to identify the corresponding inmate record 702 based on the global identifier. Accordingly, the virtual jacket system 100 can identify an inmate record 702 based on similarity between alias data and search name data. The virtual jacket system 100 can identify the inmate record 702 which may not otherwise be identified based on a comparison between the stored name data in the inmate record 702 and the search name. Accordingly, use of the alias data by virtual jacket system 100 provides a tool to identify inmate records 702 based on alias names.

A diminutive record 710 has diminutive data and actual name data. The diminutive record 710 is linked to the inmate record by the actual name data of the diminutive record and the name data of the inmate record. The system 100 can process an inmate search request comprising search name data for the inmate, determine that the search name data matches the diminutive data, return the inmate record, and populate the booking record using the inmate record. The virtual jacket system 100 can use diminutive data to generate search results and locate relevant inmate record 702. The virtual jacket system 100 can use the diminutive record 710 to match diminutive data to search data based on a similarity measure. The similarity measure can be generated based on string or character similarities. The similarity measure can also be generated based on phonetic similarities.

The system 100 can generate phonetic diminutive data. The system 100 can determine that the phonetic search name data matches the phonetic diminutive data within the commonality rank, return the inmate record, and populate the booking record using the inmate record. This creates a flexible tool for system 100 to locate relevant inmate records and expands search data to include diminutive names. The virtual jacket system 100 can use the diminutive record 710 to match diminutive data to search name data using a similarity measure meant that can be generated based on a phonetic similarity between the diminutive data and the search name data. As noted, the diminutive record 710 with the similar diminutive data can be used to identify the corresponding inmate record 702 based on a similarity between actual name data of the diminutive record 710 and name data stored in the inmate record 702. The virtual jacket system 100 can identify the inmate record 702 which may not otherwise be identified based on a direct comparison between the stored name data in the inmate record 702 and the search name data. Accordingly, use of diminutive data by virtual jacket system 100 provides a tool to identify inmate records 702 based on diminutive names.

The virtual jacket system 100 aggregates data from multiple disparate facility systems. The large data set from different sources may include multiple references to the same inmate or individual as the formatting or naming convention may not be standardized across the different data sources. The virtual jacket system 100 uses phonetic encoding, alias names, and diminutive names to create a broader set of matching rules and parameters. Virtual jacket system 100 can use both phonetic similarities and string or character similarities between search data and store data to identify relevant inmate records 702. The similarity measurement or commonality rank defines a range of acceptable variance between search data and store data.

The virtual jacket system 100 receives search terms including search name data. An example of search name data includes Last name=Shizenuvskee, First name=Chuck. For this example, the virtual jacket system 100 can identify and return inmate record 702 storing name data including Last name=Kryzanowski, First name=Charles. This is an example only. The virtual jacket system 100 uses a set of rules to determine inmate records along with phonetic encoders, alias data and diminutive data to identify inmate records that would not be otherwise located using a basic search. The system 100 uses a set of rules to identify a subset of one or more inmate records using the search name data. The example rules can select inmate records using rules to join subsets of results from different searches including results from a phonetic data match, alias data match or diminutive data match. The phonetic key record 708 has an encoder that virtual jacket system 100 can use to transform search name data from search queries into phonetic symbols and stored name data in inmate record 702 into phonetic symbols. The virtual jacket system 100 can match the phonetic symbols for the search name data into and the phonetic symbols for inmate using a commonality rank or similarity threshold. The system 100 can locate an inmate record 702 using these phonetic rules an encoding. An otherwise literal string, character or symbol comparison might not unable virtual jacket system 100 to locate the relevant inmate record 702. Instead, the virtual jacket system 100 provides a broad and flexible search tool to match search data against stored data based on a set of characteristics.

The virtual jacket system 100 can use the offender phonetic key record 706 to match the search name data (e.g. Shizenuvskee) and stored name data (e.g. Kryzanowski) based on their phonetic similarity to generate search results. The virtual jacket system 100 can implement the phonetic comparison in addition to string or character comparisons to generate search results. Accordingly, the virtual jacket system 100 can identify stored name data based on its phonetic similarity to search name data which may not otherwise be identified based on string or character similarity. The virtual jacket system 100 can use the alias record 704 to match the search name data (e.g. Chuck) and stored name data (e.g. Charles) based on the similarity of the strings, characters, or symbols. The virtual jacket system 100 can use the alias record 704 to compare alias data to the search data to identify a relevant inmate record 702. The virtual jacket system 100 can use the alias record 704 to match the search name data (e.g. Chuck) and stored name data (e.g. Charles) based on the phonetic similarity. The virtual jacket system 100 can use the alias record 704 and the offender phonetic key record 706 to match the search name data to the store alias data based on its phonetic similarity. The virtual jacket system 100 can then use the global identifier of the alias record 704 to identify the relevant inmate record 702. Accordingly, the virtual jacket system 100 can match search name data to stored name data using an alias to identify an inmate record 702 that might not otherwise be flagged if an alias was not considered.

Figure 8:
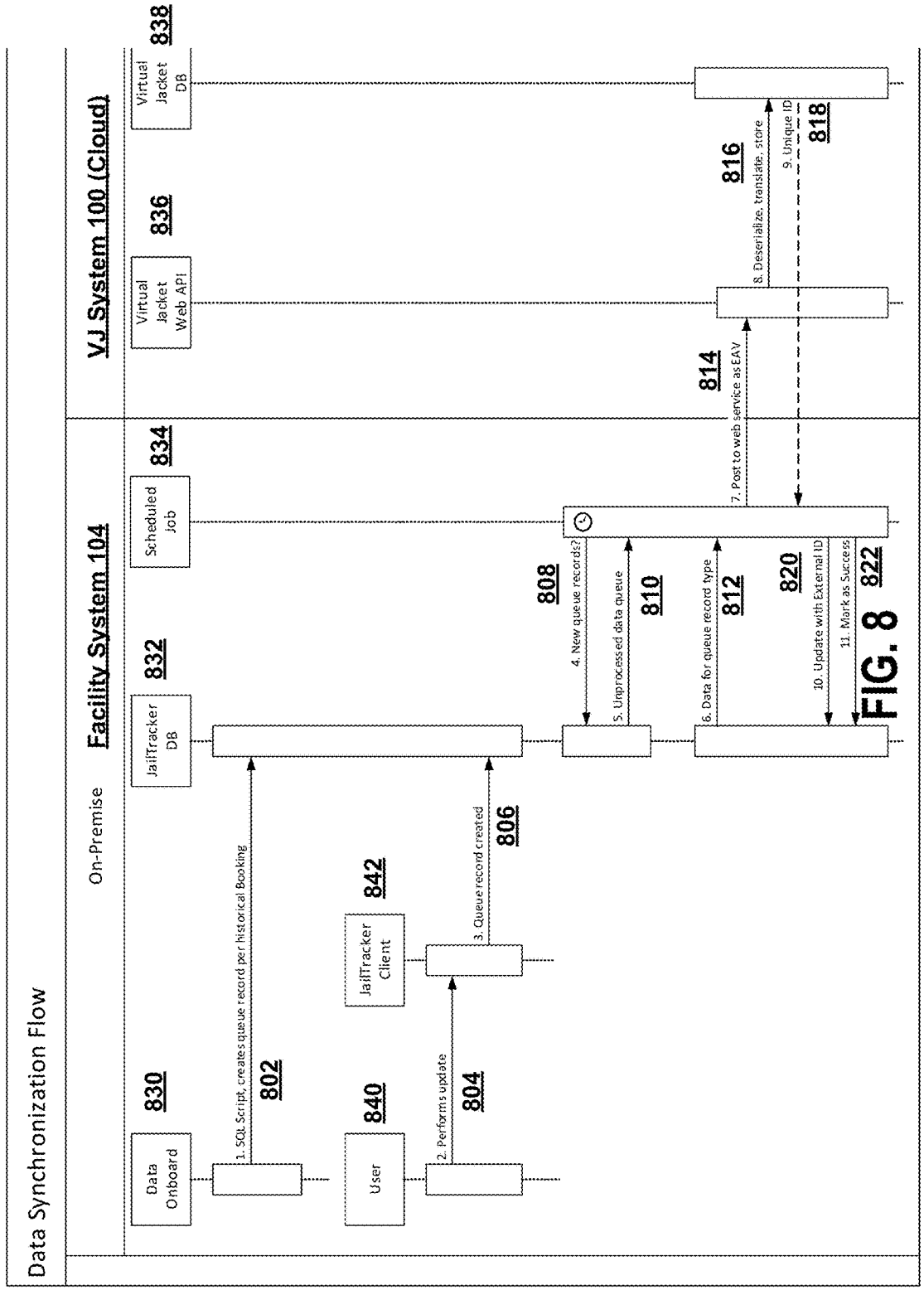
FIG. 8 is a diagram of a process for the virtual jacket system according to some embodiments.

FIG. 8 is a flowchart of a process for the virtual jacket system 100 and facility system 104 according to some embodiments. The facility system 104 includes a data onboard unit 830, jailtracker or on-premise database 832, and a scheduled job unit 834. The virtual jacket system 100 includes a virtual jacket web application programming interface (API) 836 and a virtual jacket database 838. The process can be used to continuously synchronize the data stored by the virtual jacket system 100 and the data in the different facility systems 104. The process uses a schedule or and a queue record to continuously monitor different facility systems 104 to trigger updates to the data stored by the virtual jacket system 100.

At 802, as each new facility system 104 elects to participate in data sharing, virtual jacket system 100 executes a script against the on-premise database 832, creating a new interface queue record per the historical Booking record. A scheduler will pick up the queue record for processing over time. The virtual jacket system 100 on boards data from the facility system 104 and continuously monitors and updates its data from the facility system 104 based on the=queue and scheduling.

At 804, end-user system 840 performs an update anywhere in the virtual jacket system 100 and facility system 104, with the data API (jailtracker client 842) recording from which system feature of the virtual jacket system 100 and facility system 104 the update originates. The virtual jacket system 100 can include a source identifier in relation to data elements to identify the facility system 104 that the update originated from.

At 806, when the system feature is detected related to an external interface (via configuration), jailtracker client 842 creates a queue record in the on-premise facility system 104, noting which feature was used and the appropriately identifying values unique to the new data. The virtual jacket system 100 can use this data to populate the source identifier.

At 808, a scheduled task runs on the on-premise facility system 104 operating system, however frequently the customer or external system requires. Scheduling in minutes allows near-real time updates of external systems. Each job iteration retrieves all currently unprocessed queue records based on a status marker. The virtual jacket system 100 checks for updated data from the new facility system 104 at the scheduled time in order to continuously update the store data. The virtual jacket system 100 can transform the updated data from the new facility system 1042 populate it stored records.

At 810, for each queue record, a job is initiated, containing custom code specific to interacting with the external interface.

At 812, as an interface job is started, the queue record is marked with a 'Processing' status, so not to be pulled by the scheduler again. The appropriate data corresponding to the type of queue record is retrieved from the on-premise facility system 104 database, then handed to the job schedule unit 834.

At 814, for Virtual Jacket web API 836 interface, the job schedule unit 834 transforms the data into Entity-Attribute-Value (EAV) format, corresponding to the entity schema. The EAV data is then posted over a secured web service boundary for processing. The web service accepts EAV represented as XML3 or JSON4,for example, and contains a pluggable deserialization layer in case of future transport format improvements. Accordingly, the virtual jacket system 100 can use predefined schemas to transform data from the different facility systems 104 into a common data format or schema.

At 816, if the data is already in native Virtual Jacket format, no translation is necessary. However, for third parties unable to conform to the native schema or data format, a pluggable translation layer is provided so that custom code may be written to mutate external data into native format before storage in the Virtual Jacket system 100 (database 838) sparse matrix.

At 818, once the data is stored in the virtual Jacket system 100 (database 838), unique entity identifiers are created in Virtual Jacket database 838, and returned to the requestor (e.g. job schedule unit 834) for future synchronization ability. Accordingly, the entity identifiers can link data records stored by the virtual jacket system 100 and corresponding data records stored by a remote facility system 104. When an update is detected at a data record stored by a remote facility system 104 then the virtual jacket system 100 can use the entity identifier to make a corresponding update to its data record linked thereto.

At 820, the scheduled custom job for Virtual Jacket system 100 receives the external ID and associates the appropriate records within the on-premise database with the external Virtual Jacket identifiers for future synchronization reference.

At 822, the queue record is then closed with a 'Success' marker, further preventing re-processing during the future scheduler iterations. Upon any errors and failures, they are logged and associated with the queue record, which is marked accordingly to expose it for re-processing on the next scheduled iteration, which allows for outages and maintenance windows at the Virtual Jacket data center facility.

FIGS. 9 to 16 provide example screenshots of interfaces, including search interfaces and report, hold request interfaces. The reference JT refers to JailTracker, a client application for the facility system 104. The client application provides an on premise data source for Virtual Jacket data in some embodiments.

Figure 9:
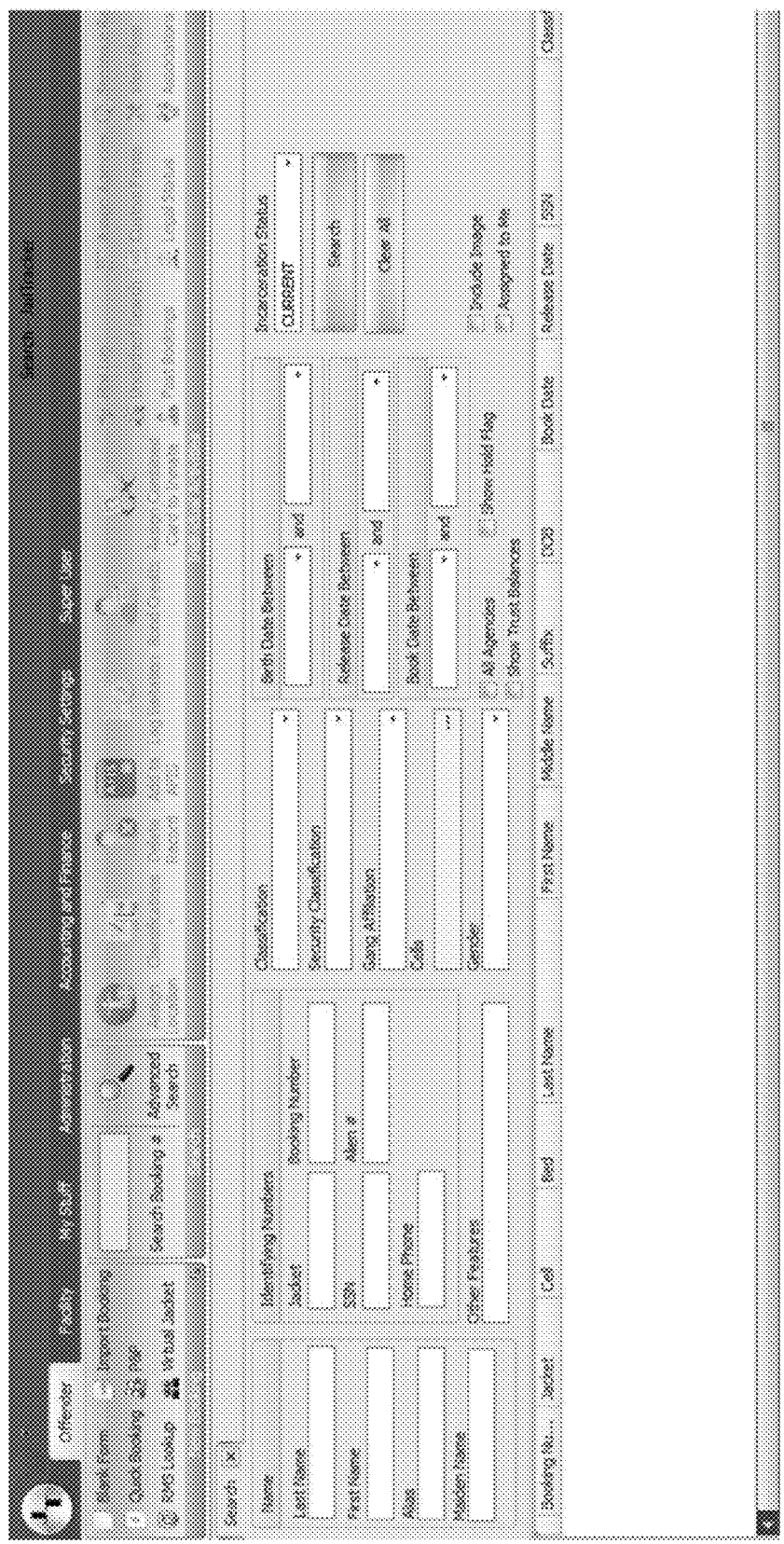
FIG. 9 is a screenshot of an example graphical user interface with an inmate record according to some embodiments.

FIG. 9 shows a screen shot for Initiating Virtual Jacket (tool bar button) from the JT main screen along with different search fields. The screenshot shows an interface for the virtual jacket system 100. The interface includes a form of form fields to receive and display data stored by the virtual jacket system 100 in different records. For example, the interface includes an offender form with multiple form fields including name data, identification data, classification data, facility data and incarceration status. The name data can include last name, first name, alias, maiden name, diminutive name and so on. The identification data can include a global identifier, a booking number, a Social Security or insurance number, foreign identification number, phone number, and other features. The classification data can include a security classification, gang affiliation, cells, age, gender, release date, and booked date, for example. The offender form includes form fields that can be populated through data entry or automatically using store data. For example, entering a global identifier can trigger an update to interface two populate the form fields with data stored in an inmate record 702 corresponding to the global identifier. The data can be updated at the form which can in turn trigger updates to the store data.

Figure 10:
FIG. 10 is a screenshot of an example graphical user interface with search fields according to some embodiments.

FIG. 10 shows a screen shot for a Virtual Jacket search laid over the top of the same JT main screen (data pre-populates, pushed from main search screen automatically into Virtual Jacket search fields). The screenshot shows an interface for the virtual jacket system 100 that includes a search form of form fields to receive search data to trigger the return and display of results data. The search form can include different search fields such as search name data, search identification data, search classification data, search facility data, search incarceration status data, and so on. The search form of form fields receives search data as a search query. The virtual jacket system 100 processes the search data to generate result data for display as part of the search form or as a separate results interface or window. The results interface can enable actions to be implemented by virtual jacket system 100 such as booking an inmate, adding a hold, adding an alert, and requesting more information.

Figure 11:
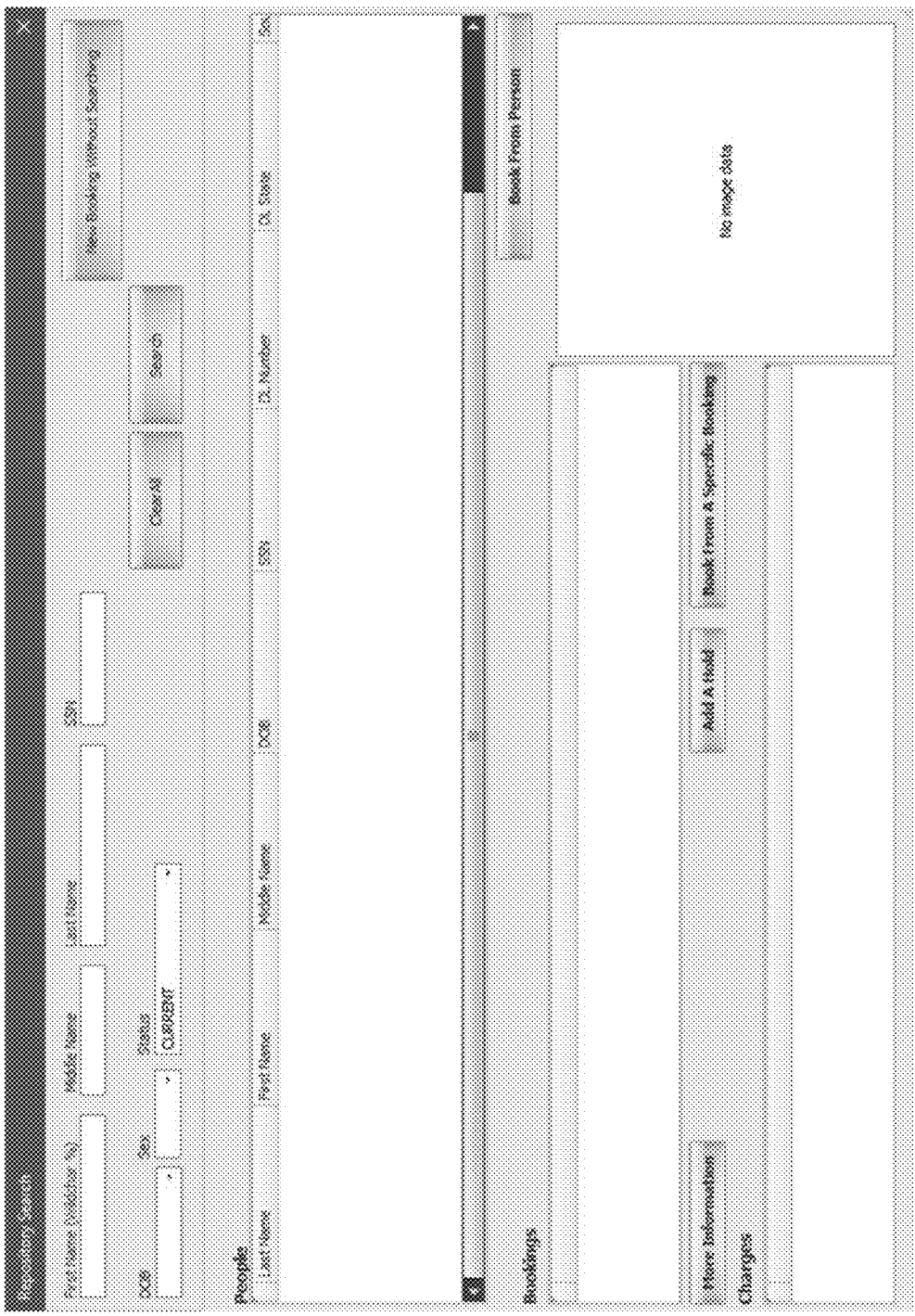
FIG. 11 is a screenshot of an example graphical user interface with search fields according to some embodiments.
Figure 12:
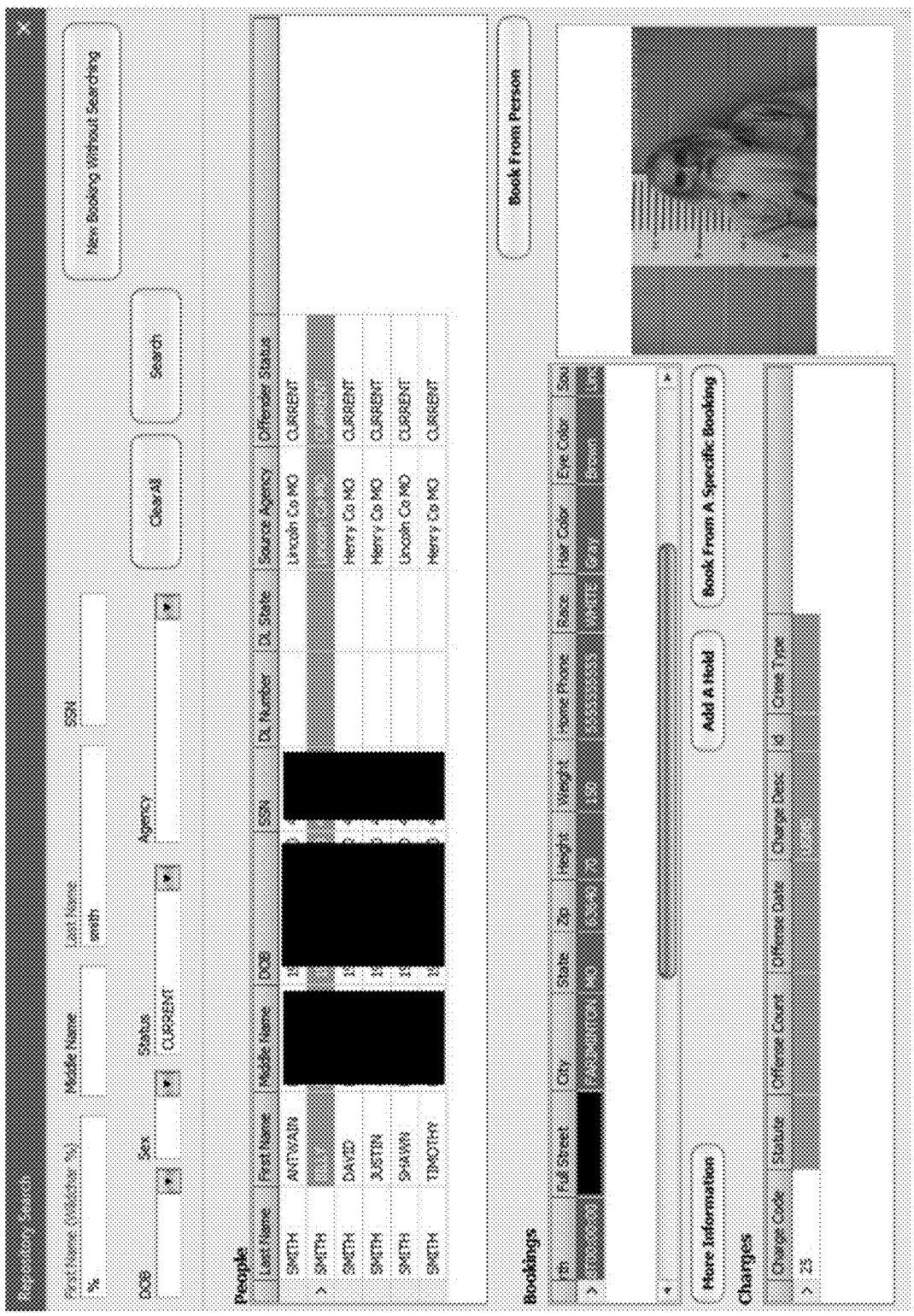
FIG. 12 is a screenshot of an example graphical user interface with search results according to some embodiments.

FIGS. 11 and 12 show screenshot of an interface with full and empty Virtual Jacket search form, including a full and filled-in Virtual Jacket search fields with results and details. The search form can include different fields such as name fields, identification number fields, birthdate fields and so on. The search screen can include different action triggers such as a new booking, a hold, book from search results, and so on. The search form can indicate search results such as a listing of inmates that match search data within a similarity measurement, for example. The listing of inmates includes multiple selectable inmate references that can be used to trigger additional actions such as a booking or a hold, for example. The listing of inmates is a set of selectable inmate references. The inmates in the listing can be ranked based on similarity measurement, where more similar results are returned higher in the list than less similar results.

Figure 13:
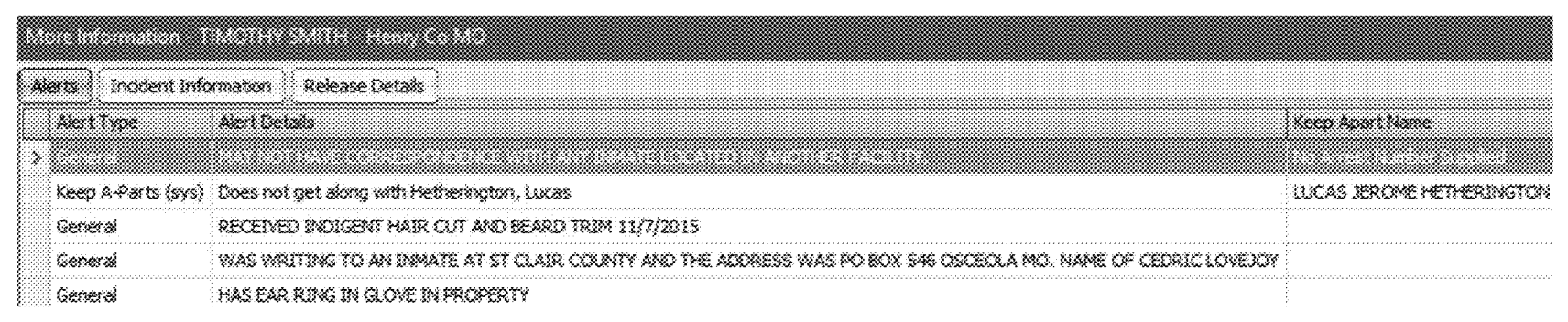
Figure 14:
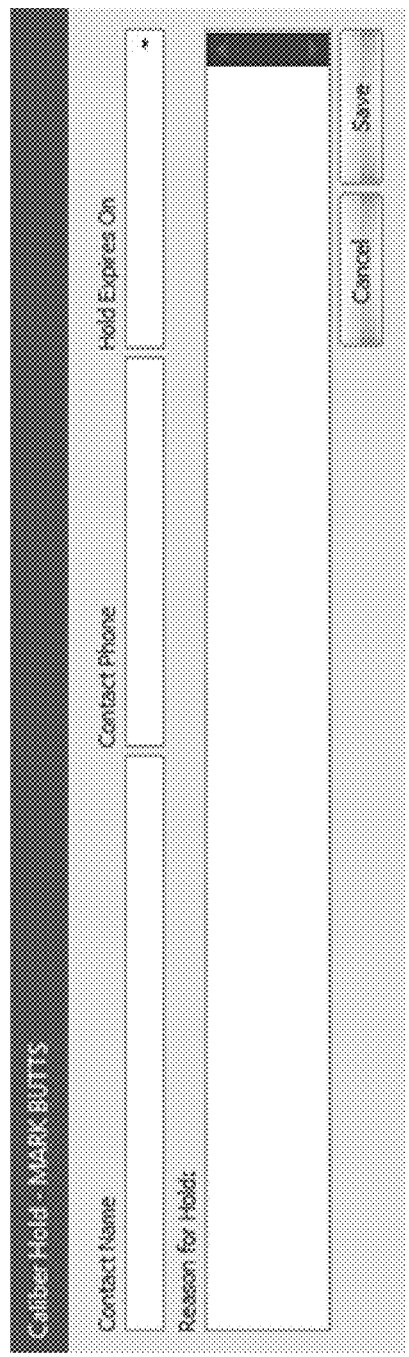
FIG. 14 is a screenshot of an example graphical user interface with a hold feature according to some embodiments.
Figure 15:
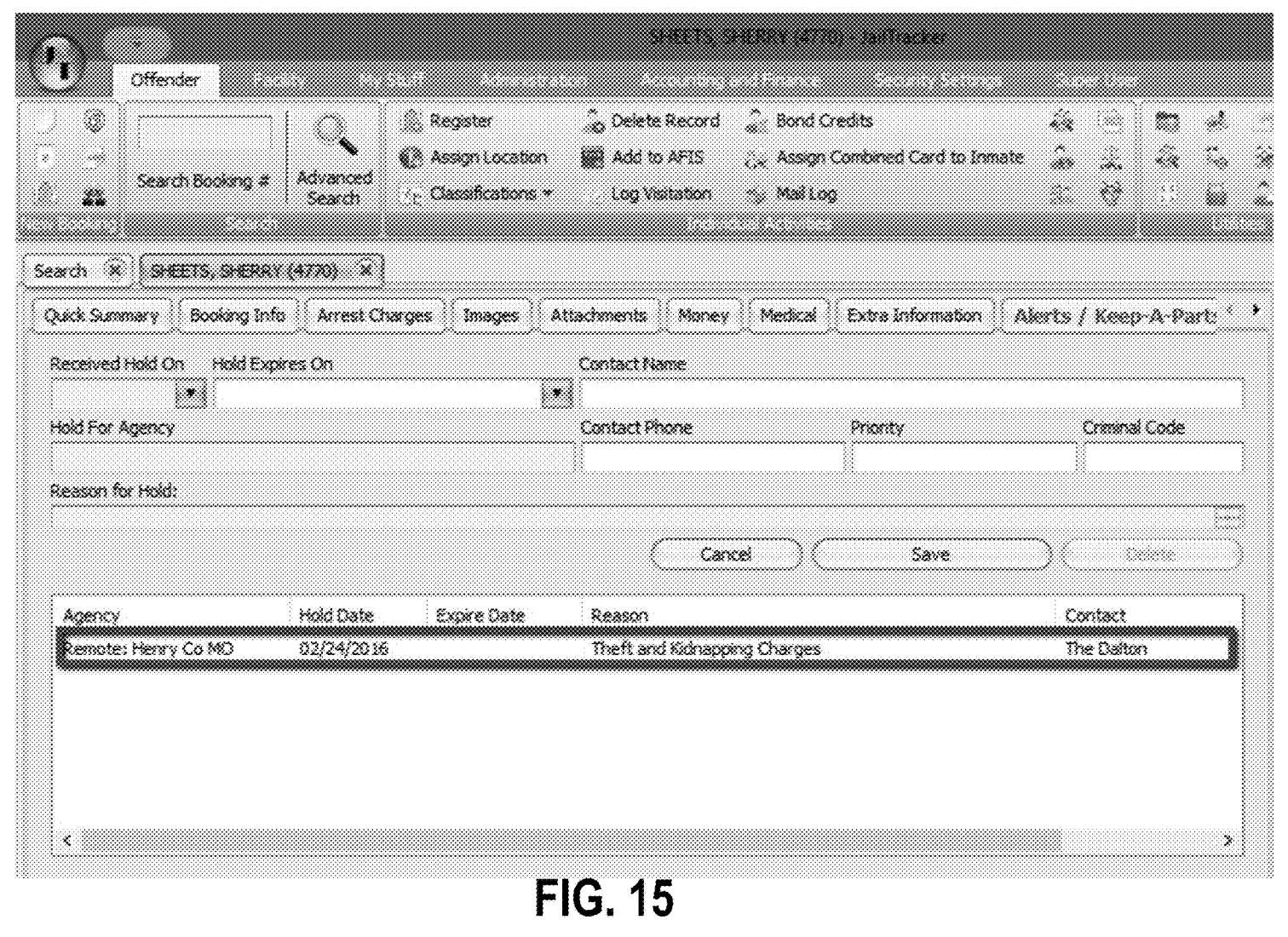

FIG. 13 shows a screenshot of a supplemental detail interface. The supplemental information screen can provide additional information regarding an inmate for example. The additional information can include alert information, incident information release details and so on. The additional information includes a listing of data elements. Each data element is selectable for modification. FIGS. 14 and 15 show screen shots of the process for creating and viewing the remote holds, both from the perspective of a JT user seeing a hold placed by a remote agency having used Virtual Jacket system 100. For example, the screenshot shows an interface with a hold form for creating a hold. The hold form includes multiple fields for creating a hold. Example fields include contact name, contact phone number, time period for the hold, reason for the hold, and so on. The hold form can integrate with the results form. For example an inmate search can return an inmate record. The inmate record can be selectable to create a hold for the inmate identified in the record. The virtual jacket system 100 can display the hold form that can be auto populated with data from the stored inmate record along with other store data. The virtual jacket system 100 then creates a hold record linked corresponding inmate record by a global identifier. A subsequent search for the inmate can also trigger a return of the relevant hold information.

Figure 16:
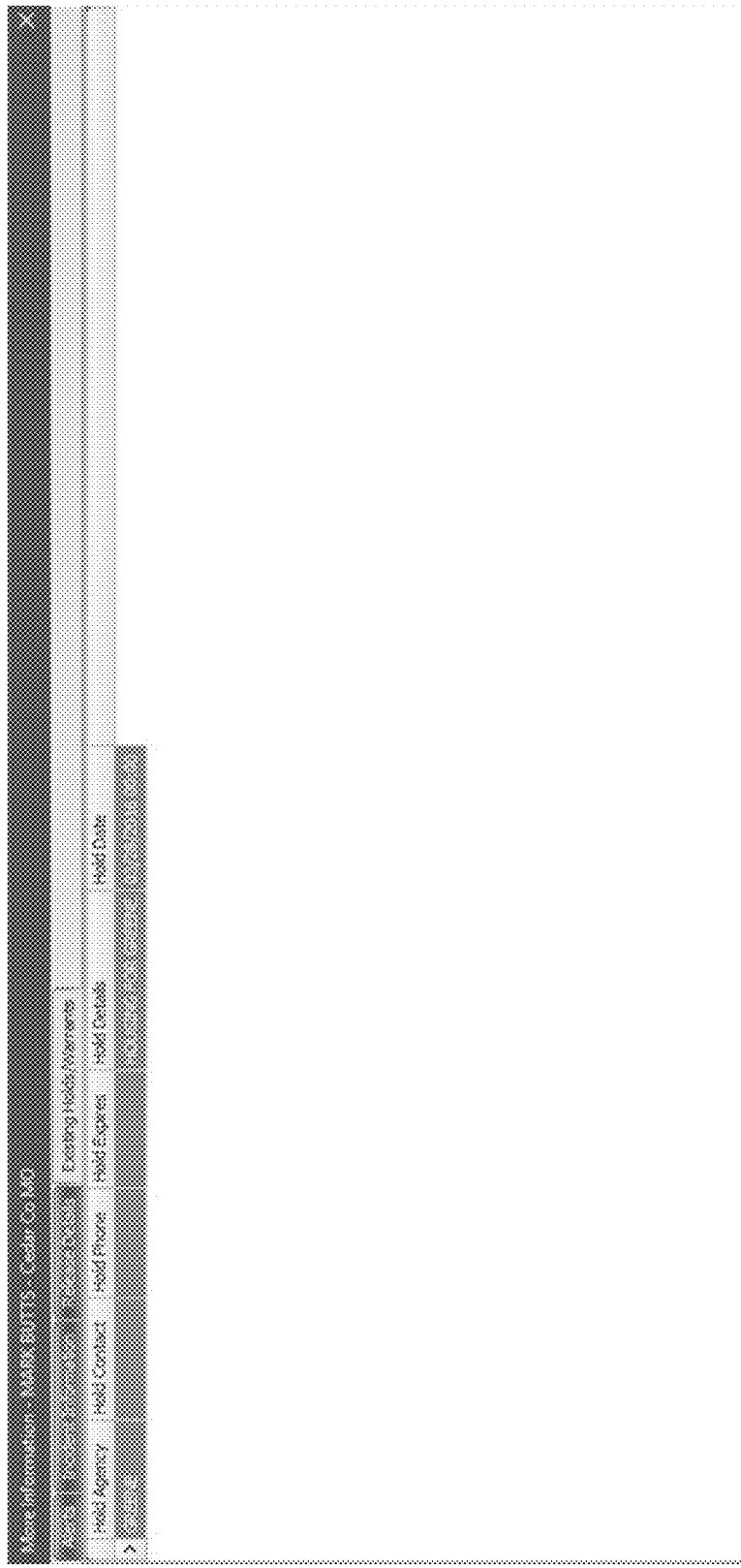
FIG. 16 is a screenshot of an example graphical user interface with facility data according to some embodiments.
Figure 17A:
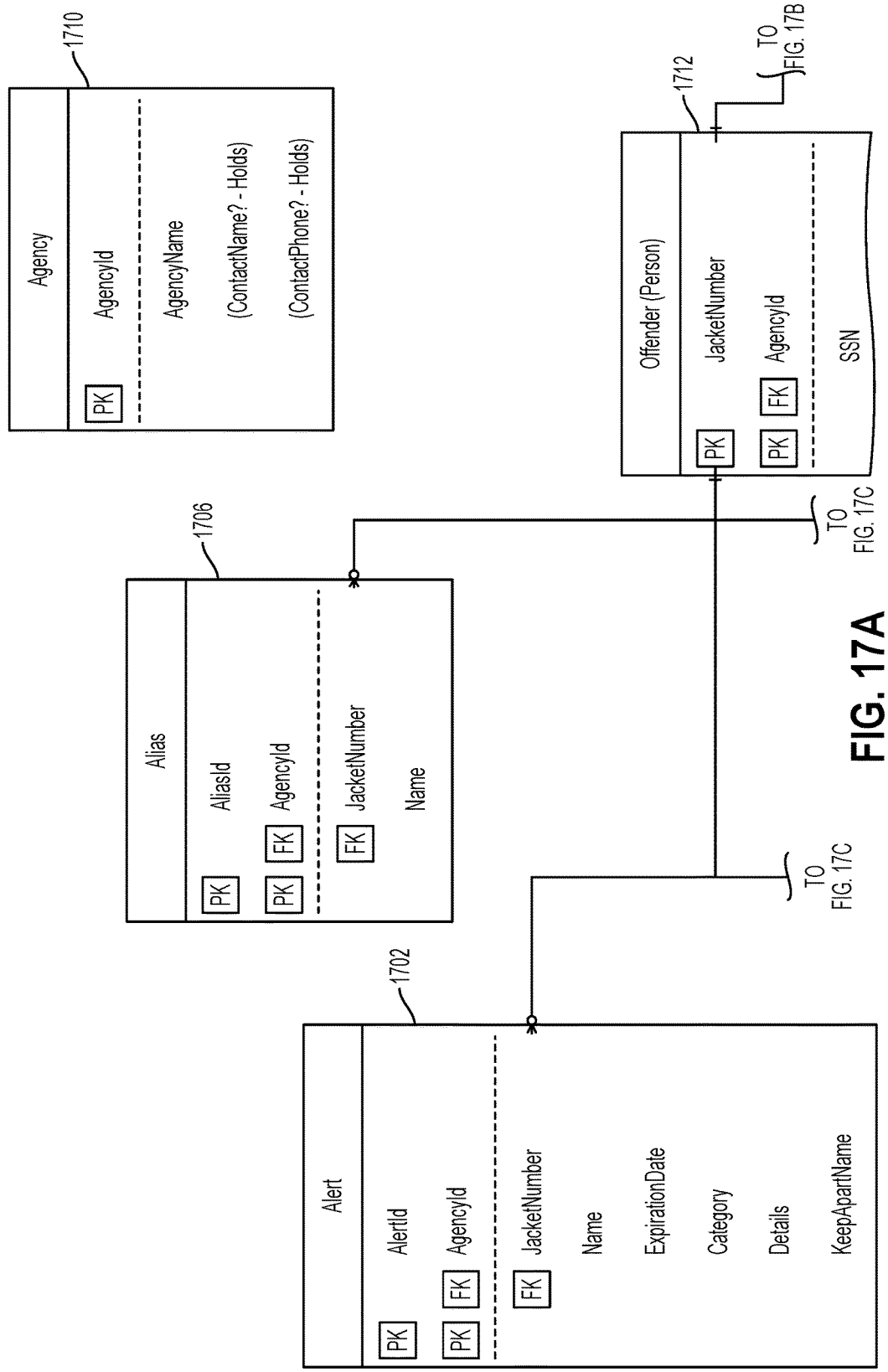
Figure 17B:
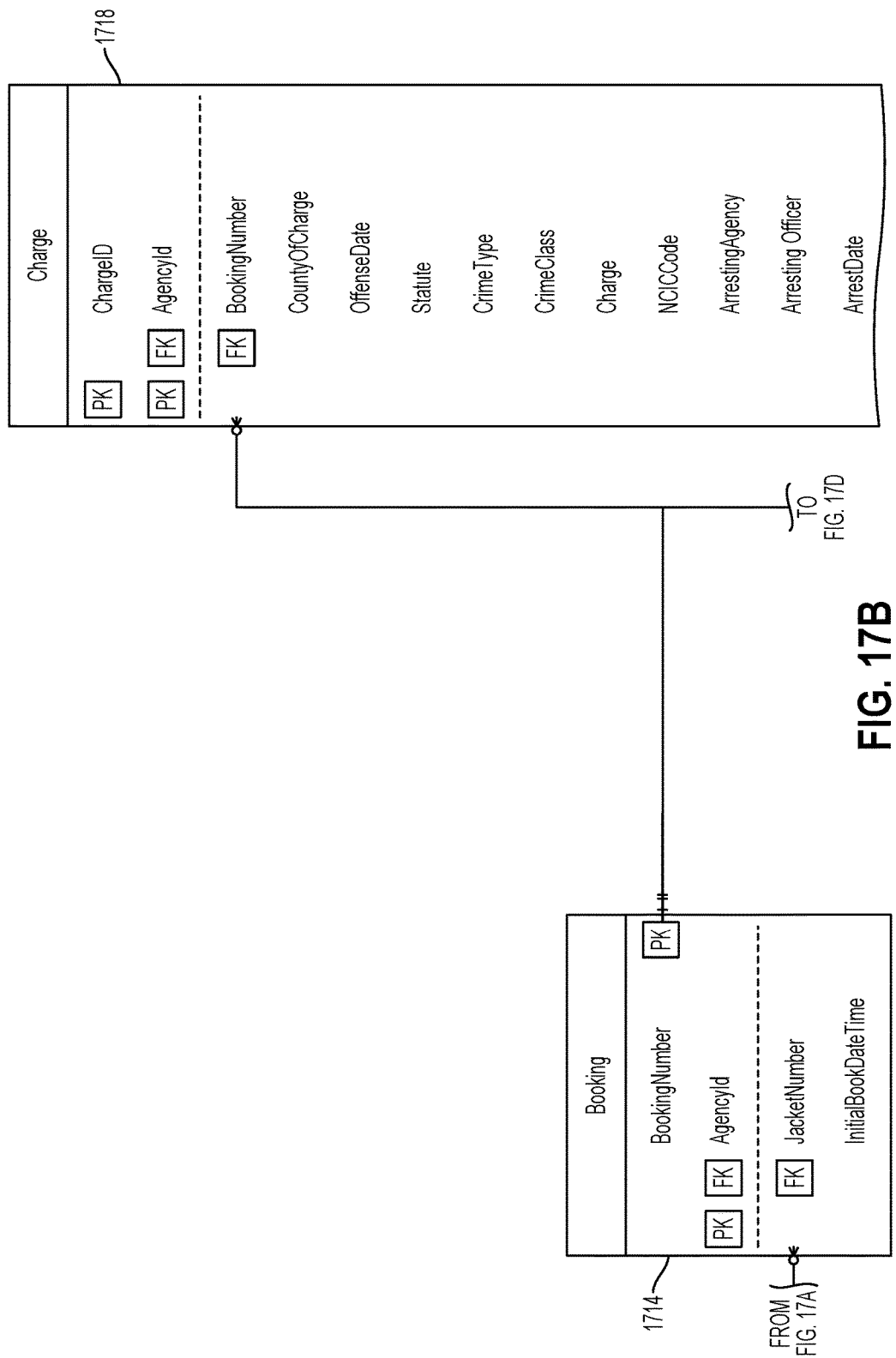
Figure 17D:
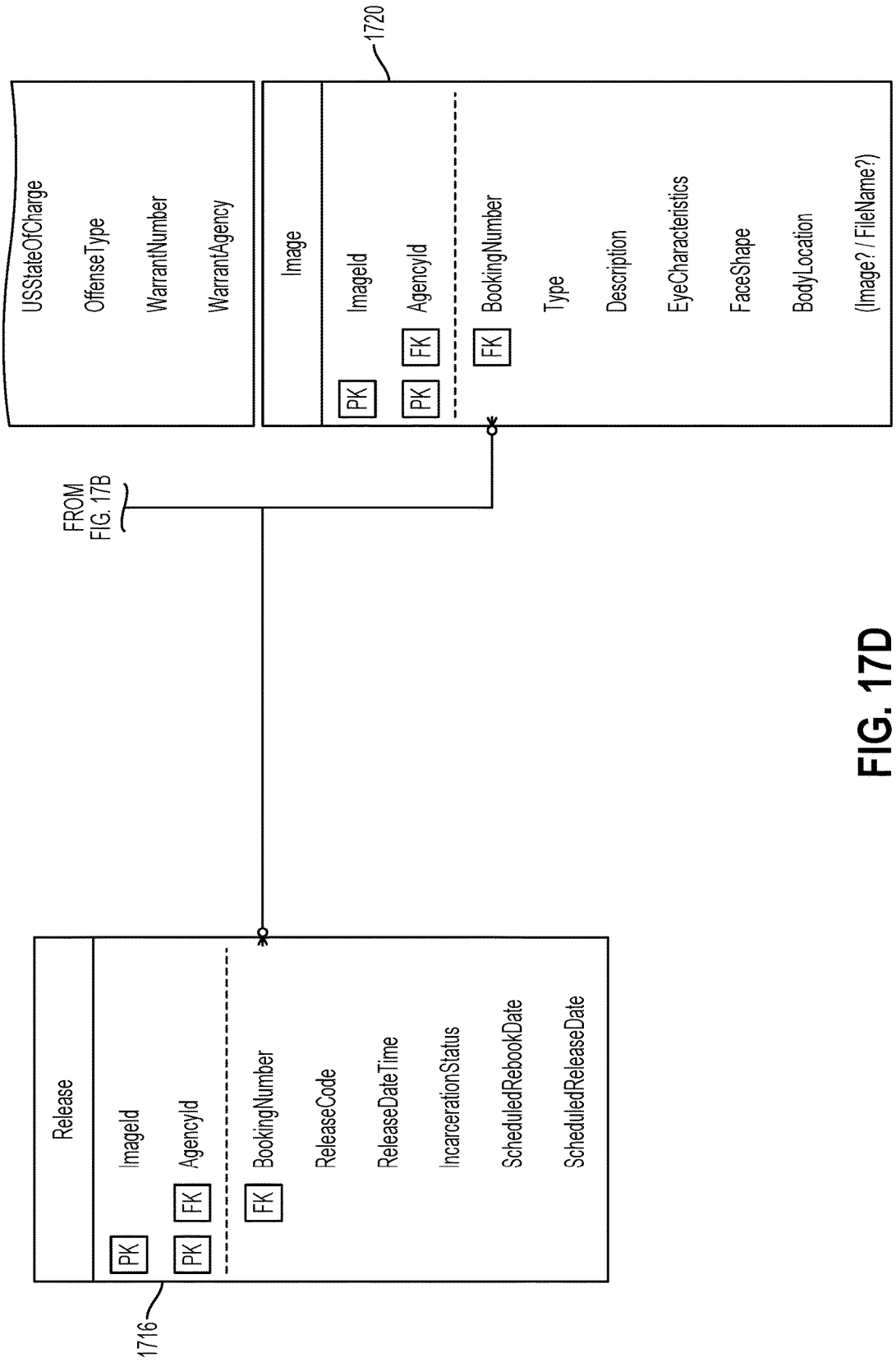

FIG. 16 shows a screenshot from another remote agency (facility system 104) seeing another remote agency's hold from within Virtual Jacket system 100. Accordingly, virtual jacket system 100 enables remote facility systems 104 to connect and share data.

FIGS. 17A, 17B, 17C, 17D diagrams of data structures 1700 and links for data synchronization according to some embodiments. An alert record 1702 has different fields and is create alerts or notifications to alert facility system 104 and virtual jacket system 100 for data updates, inconsistency, verifications, expiration, and so on. The alert record 1702 fields include foreign and primary key fields such as alert identifier, agency (facility system 104) identifier, and JacketNumber identifier (an example global identifier). Other fields include active, expiration date, category, details, keep apart name, and so on. A contact record 104 has different fields including foreign and primary key fields such as contact identifier, agency identifier, and JacketNumber identifier. An alias record 1706 has different fields for different alias instances including foreign and primary key fields such as alias identifier, agency (facility system 104) identifier, JacketNumber. The alias record 1706 has a name field. A hold record 1708 has different fields including foreign and primary key fields such as hold identifier, agency identifier, and JacketNumber. The hold record 1708 has other fields including received date, expiration date, HoldForAgency identifier, Reason, CriminalCode, and so on.

An agency (facility system 104) record 1710 has different fields including foreign and primary key fields such as an agency identifier. The agency (facility system 104) record 1710 has other fields including agency name, contact name for holds and contact number for holds.

An offender record 1712 has different fields including foreign and primary key fields such as JacketNumber identifier and agency identifier. The offender record 1712 has other fields including social security number, first name, middle name, last name, maiden name, gender, birth date, birth place, deceased date, race, ethnicity, nationality, hair color, eye color, height, weight, and so on.

A booking record 1714 has different fields including foreign and primary key fields such as JacketNumber identifier and agency identifier. The booking record 1714 has other fields including booking number, initial book time and date, and so on.

A release record 1716 has different fields including foreign and primary key fields such as agency identifier, image identifier and a booking number. The release record 1716 has other fields including release code, release date and time, incarceration status, scheduled rebook date, scheduled release date and so on.

A charge record 1718 has different fields including foreign and primary key fields such as agency identifier, a charge identifier, and a booking number. The charge record 1718 has other fields including country of charge, offense date, statute, crime type, crime class, charge, NCIC code, arresting agency, arresting officer, arrest date, state of charge, offense type, warrant number, warrant agency, and so on.

An image record 1720 has different fields including foreign and primary key fields such as agency identifier, an image identifier, and a booking number. The image record 1720 has other fields including type, description, eye characteristics, face shape, body location, image file name, and so on.

These are example records and fields for the data synchronization.

The inmate record 1712 includes a global identifier that connects or links to other records. For example, the inmate record 1712 is linked to the alias record 1706 by the global identifier. As another example, the inmate record 1712 is linked to the alert record 1702 by the global identifier. The inmate record 1712 can also be linked to a contact record 1704 by the global identifier and a hold record 1708 by the global identifier. Accordingly, the global identifier provides a way to link different records and fields or entry values of the records.

In some embodiments, the inmate record 1712 can be linked to a booking record 1714 by the global identifier. The booking record 1714 can also include a booking identifier. A charge record 1718 can be linked to the booking record 1714 by the booking identifier. An image record 1720 can be linked to the booking record 1714 by the booking identifier, and the image record 1720 can include images and descriptions of inmates. A release record 1716 can be linked to the booking record 1714 by the booking identifier.

Figure 18:
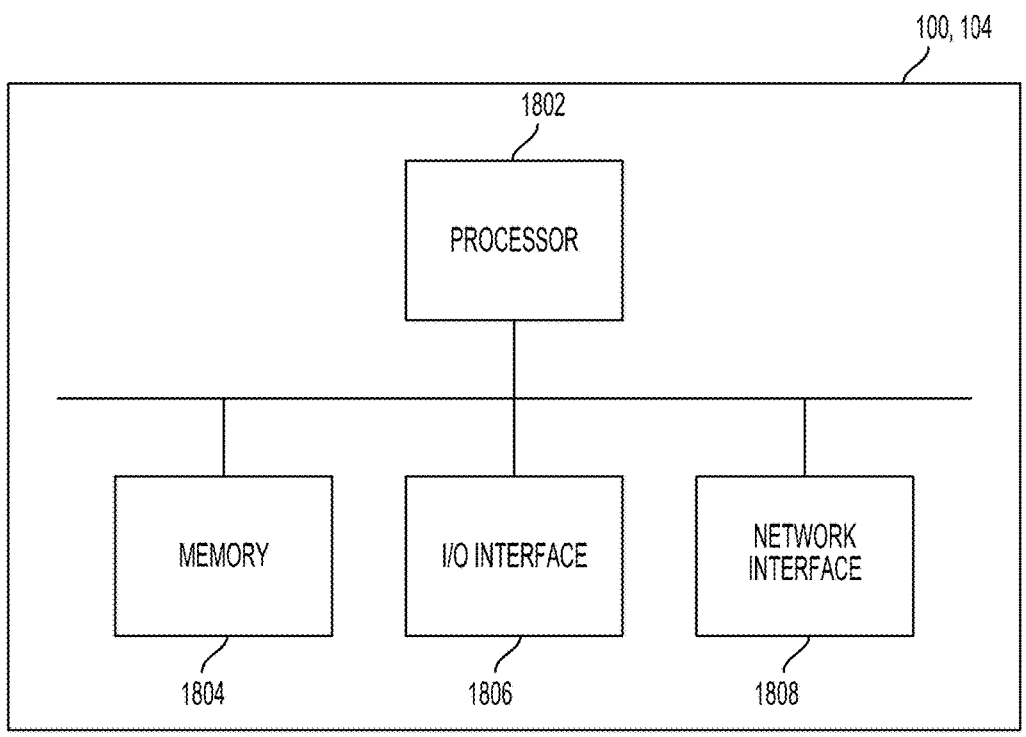
FIG. 18 is a diagram of a computing device according to some embodiments.

FIG. 18 shows an example computing device that may be used to implement aspects of virtual jacket system 100 or facility system 104. The virtual jacket system 100 includes at least one processor 1802, memory 1804, at least one I/O interface 1806, and at least one network interface 1808.

Each processor 1802 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 1804 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1806 enables computing device to interconnect with one or more input devices, such as a keyboard, mouse, camera, touch screen and a microphone, or with one or more output devices such as a display screen and a speaker.

Each network interface 1808 enables computing device to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Computing device is operable to register and authenticate users (using a login, unique identifier, and password for example) prior to providing access to applications, a local network, network resources, other networks and network security devices. Computing device may serve one user or multiple users.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. An inmate facility management system comprising:
   a shared storage device to store a plurality of inmate records and a plurality of facility records from multiple disparate facility systems;
   an interface to receive a search request for an open bed in a facility system for an inmate;
   a processor configured to:
     translate data from the multiple disparate facility systems to the plurality of inmate records and the plurality of facility records;
     determine in real time a set of open beds for an aggregated jail capacity using the plurality of inmate records and the plurality of facility records from the multiple disparate facility systems;

update the interface to indicate the set of open beds for the aggregated jail capacity;

receive a booking request to book the open bed from the set of open beds;

update an inmate record of the plurality of inmate records corresponding to the inmate and a facility record of the plurality of facility records corresponding to the facility system;

populate a booking record for the open bed using the inmate record and the facility record;

update the interface to display the booking request, the inmate record and the facility record; and wherein the inmate record has a plurality of fields comprising a global identifier and name data, the shared storage device storing an inmate phonetic key record linked to the inmate record by the global identifier, a phonetic key record linked to the inmate phonetic key by a phonetic key identifier, the inmate phonetic key record comprising a commonality rank, the phonetic key record comprising encoding for transforming the name data into phonetic name data, the processor configured to process an inmate search request comprising search name data for the inmate, generate phonetic search name data, determine that the phonetic search name data matches the phonetic name data within the commonality rank, and return the inmate record.

2. The inmate facility management system of claim 1 wherein the processor is configured to process the booking request by executing a local and extended search using a link between a local inmate record and a shared inmate record, populate the booking record using the results of the local and extended search, and update the local inmate record and the shared inmate record to indicate the booking record.

3. The inmate facility management system of claim 1 wherein the processor is configured to receive a warrant request, execute a local and extended search using the warrant request and a link between a local inmate record and a shared inmate record, generate a hold request based on the results of the local and extended search, and update the local inmate record and the shared inmate record to indicate the hold request.

4. The inmate facility management system of claim 1 wherein the processor is configured to receive a release request, execute a local and extended search using the release request and a link between a local inmate record and a shared inmate record, populate a release record using the results of the local and extended search, and update the local inmate record and the shared inmate record to indicate the release request.

5. The inmate facility management system of claim 1 wherein the shared storage device stores an alias record having alias data, the alias record linked to the inmate record by the global identifier, the processor configured to generate phonetic alias data, determine that the phonetic search name data matches the phonetic alias data within the commonality rank, return the inmate record, and populate the booking record using the inmate record.

6. The inmate facility management system of claim 1 wherein the shared storage device stores a diminutive record having diminutive data and actual name data, the actual name data of the diminutive record linked to the name data of the inmate record, the processor configured to generate phonetic diminutive data, determine that the phonetic search name data matches the phonetic diminutive data within the commonality rank, return the inmate record, and populate the booking record using the inmate record.

7. The inmate facility management system of claim 1 wherein the inmate record has a plurality of fields comprising a global identifier and name data, the shared storage device storing an alias record linked to the inmate record by the global identifier, the alias record having alias data, the processor configured to process an inmate search request comprising search name data for the inmate, determine that the search name data matches the alias data, return the inmate record, and populate the booking record using the inmate record.

8. The inmate facility management system of claim 1 wherein the inmate record has a plurality of fields comprising a global identifier and name data, the shared storage device storing a diminutive record having diminutive data and actual name data, the diminutive record linked to the inmate record by the actual name data of the diminutive record and the name data of the inmate record, the processor configured to process an inmate search request comprising search name data for the inmate, determine that the search name data matches the diminutive data, return the inmate record, and populate the booking record using the inmate record.

9. The inmate facility management system of claim 1 wherein the processor is configured to synchronize the data storage device storing the plurality of inmate records and the plurality of facility records with updated data from the multiple disparate facility systems.

10. The inmate facility management system of claim 9 wherein the processor is configured to synchronize the data storage device by receiving an election to participate in data sharing from a first facility system, storing a new facility record for the first facility system, loading additional data from the first facility system, translating the additional data into a common schema to update the plurality of inmate records, and creating a new queue record for a scheduler to continuously check the first facility system for further data over a time period.

11. The inmate facility management system of claim 9 wherein the processor is configured to synchronize the data storage device using an application programming interface between a client interface at a first facility system and a cloud interface at the data storage device.

12. The inmate facility management system of claim 9 wherein the processor is configured to synchronize the data storage device by assigning unique global identifiers that are used for records of the disparate facility systems and the data storage device.

13. A process for an inmate facility management system comprising:

storing, on a shared storage device, a plurality of inmate records and a plurality of facility records from multiple disparate facility systems, the plurality of inmate records comprising an inmate record with a global identifier and name data;

storing an inmate phonetic key record linked to the inmate record by the global identifier, a phonetic key record linked to the inmate phonetic key by a phonetic key identifier, the inmate phonetic key record comprising a commonality rank, the phonetic key record comprising encoding for transforming the name data into phonetic name data;

receiving, at a processor, a search request for an open bed in a facility system for an inmate, the search request comprising search name data for the inmate;

generating phonetic search name data;

determining that the phonetic search name data matches the phonetic name data within the commonality rank;

returning the inmate record;

translating data from the multiple disparate facility systems to the plurality of inmate records and the plurality of facility records;

determining, at the processor in real time, a set of open beds for an aggregated jail capacity using the plurality of inmate records and the plurality of facility records from the multiple disparate facility systems;

updating an interface to indicate the set of open beds for the aggregated jail capacity;

receiving a booking request to book the open bed from the set of open beds;

updating the inmate record and a facility record of the plurality of facility records corresponding to the facility system;

populating a booking record fo the open bed using the inmate record and the facility record; and updating the interface to display the booking request, the inmate record and the facility record.

14. The process of claim 13 further comprising processing the booking request by executing a local and extended search using a link between a local inmate record and a shared inmate record, populating the booking record using the results of the local and extended search, and updating the local inmate record and the shared inmate record to indicate the booking record.

15. The process of claim 13 further comprising receiving a warrant request, executing a local and extended search using the warrant request and a link between a local inmate record and a shared inmate record, generating a hold request based on the results of the local and extended search, and updating the local inmate record and the shared inmate record to indicate the hold request.

16. The process of claim 13 further comprising receiving a release request, executing a local and extended search using the release request and a link between a local inmate record and a shared inmate record, populating a release record using the results of the local and extended search, and updating the local inmate record and the shared inmate record to indicate the release request.

17. The process of claim 13 further comprising storing an alias record having alias data, the alias record linked to the inmate record by the global identifier, generating phonetic alias data, determine that the phonetic search name data matches the phonetic alias data within the commonality rank, returning the inmate record, and populating the booking record using the inmate record.

18. The process of claim 13 further comprising storing a diminutive record having diminutive data and actual name data, the actual name data of the diminutive record linked to the name data of the inmate record, generating phonetic diminutive data, determining that the phonetic search name data matches the phonetic diminutive data within the commonality rank, returning the inmate record, and populating the booking record using the inmate record.

19. The process of claim 13 further comprising generating the inmate record with a global identifier and name data, the shared storage device storing an alias record linked to the inmate record by the global identifier, the alias record having alias data, the processor configured to process an inmate search request comprising search name data for the inmate, determine that the search name data matches the alias data, return the inmate record, and populate the booking record using the inmate record.

20. The process of claim 13 further comprising generating the inmate record with a global identifier and name data, storing a diminutive record having diminutive data and actual name data, the diminutive record linked to the inmate record by the actual name data of the diminutive record and the name data of the inmate record, processing an inmate search request comprising search name data for the inmate, determining that the search name data matches the diminutive data, return the inmate record, and populating the booking record using the inmate record.

21. The process of claim 13 further comprising synchronizing the data storage device storing the plurality of inmate records and the plurality of facility records with updated data from the multiple disparate facility systems.

22. The process of claim 13 further comprising synchronizing the data storage device by receiving an election to participate in data sharing from a first facility system, storing a new facility record for the first facility system, loading additional data from the first facility system, translating the additional data into a common schema to update the plurality of inmate records, and creating a new queue record for a scheduler to continuously check the first facility system for further data over a time period.

23. The process of claim 13 further comprising synchronizing the data storage device using an application programming interface between a client interface at a first facility system and a cloud interface at the data storage device.

24. The process of claim 13 further comprising synchronizing the data storage device by assigning unique global identifiers that are used for records of the disparate facility systems and the data storage device.

25. An inmate facility management device comprising:
an interface to access a shared storage device storing a plurality of inmate records and a plurality of facility records from multiple disparate facility systems, and receive a search request for an open bed in a facility system for an inmate, wherein an inmate record of the plurality of inmate records has a plurality of fields comprising a global identifier and name data, the shared storage device further storing an inmate phonetic key record linked to the inmate record by the global identifier, a phonetic key record linked to the inmate phonetic key by a phonetic key identifier, the inmate phonetic key record comprising a commonality rank, the phonetic key record comprising encoding for transforming the name data into phonetic name data;

a processor configured to:
translate data from the multiple disparate facility systems to the plurality of inmate records and the plurality of facility records;

determine in real time a set of open beds for an aggregated jail capacity using the plurality of inmate records and the plurality of facility records from the multiple disparate facility systems;

update the interface to indicate the set of open beds for the aggregated jail capacity;

receive a booking request to book the open bed from the set of open beds;

process an inmate search request comprising search name data for the inmate, generate phonetic search name data, determine that the phonetic search name data matches the phonetic name data within the commonality rank, and return the inmate record;

update the inmate record of the plurality of inmate records corresponding to the inmate and a facility record of the plurality of facility records corresponding to the facility system;

populate a booking record for the open bed using the inmate record and the facility record; and update the interface to display the booking request, the inmate record and the facility record.

* * * * *